United States Patent
Trim et al.

(10) Patent No.: US 12,008,120 B2
(45) Date of Patent: Jun. 11, 2024

(54) DATA DISTRIBUTION AND SECURITY IN A MULTILAYER STORAGE INFRASTRUCTURE

(71) Applicant: International Business Machines Corporation, Armonk, NY (US)

(72) Inventors: Craig M. Trim, Ventura, CA (US); Shikhar Kwatra, San Jose, CA (US); Bennet Prabhu, Tiruvallur (IN); Jayabalan Arumugam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/339,826

(22) Filed: Jun. 4, 2021

(65) Prior Publication Data

US 2022/0391519 A1     Dec. 8, 2022

(51) Int. Cl.
    *G06F 21/62*        (2013.01)
    *G06F 11/10*        (2006.01)
    (Continued)

(52) U.S. Cl.
    CPC ...... *G06F 21/6209* (2013.01); *G06F 11/1004* (2013.01); *G06F 18/23* (2023.01);
    (Continued)

(58) Field of Classification Search
    CPC .. G06F 21/6209; G06F 21/602; G06F 40/205; G06F 18/23; G06F 11/1004; G06N 20/20
    See application file for complete search history.

(56) References Cited

U.S. PATENT DOCUMENTS

| 10,339,455 | B1 * | 7/2019 | Parush-Tzur | ........... G06F 3/061 |
| 2005/0226601 | A1 * | 10/2005 | Cohen | ............... H04N 21/23614 386/280 |

(Continued)

FOREIGN PATENT DOCUMENTS

| CN | 107871164 A | 4/2018 |
| CN | 113014649 A | 6/2021 |
| WO | 2019055355 A1 | 3/2019 |

OTHER PUBLICATIONS

Wang, Tian et al. A Three-Layer Privacy Preserving Cloud Storage Scheme Based on Computational Intelligence in Fog Computing. IEEE Transactions on Emerging Topics in Computational Intelligence, vol. 2, No. 1, Feb. 2018, pp. 3-12.

(Continued)

*Primary Examiner* — Vance M Little
(74) *Attorney, Agent, or Firm* — Michael O'Keefe

(57) ABSTRACT

Techniques are described relating to data distribution and security in a multilayer storage infrastructure. An associated computer-implemented method includes receiving file data associated with a user for storage in a managed services domain, applying an ensemble learning model to devise a data distribution technique for the file data based upon contextual information associated with the user, and encrypting the file data. The method further includes, based upon the data distribution technique, dividing the file data to store among a cloud computing layer, a fog computing layer, and a local computing layer by performing a hash transformation and applying at least one cyclic error correcting code. In an embodiment, the method further includes receiving a data access request associated with the file data, authenticating the data access request, and restoring the file data via decryption.

18 Claims, 11 Drawing Sheets

(51) Int. Cl.
  *G06F 18/23* (2023.01)
  *G06F 21/60* (2013.01)
  *G06F 40/205* (2020.01)
  *G06N 20/20* (2019.01)
(52) U.S. Cl.
  CPC .......... *G06F 21/602* (2013.01); *G06F 40/205* (2020.01); *G06N 20/20* (2019.01)

(56) References Cited

U.S. PATENT DOCUMENTS

| | | | |
|---|---|---|---|
| 2008/0005475 A1* | 1/2008 | Lubbers | G06F 3/0644 711/118 |
| 2012/0303736 A1* | 11/2012 | Novotny | H04L 67/1097 709/213 |
| 2015/0227964 A1* | 8/2015 | Yan | G06Q 30/0277 705/14.43 |
| 2016/0132908 A1* | 5/2016 | von Walstrom | G06Q 30/0202 705/7.31 |
| 2016/0147946 A1* | 5/2016 | Von Reden | G16H 10/60 705/3 |
| 2016/0171119 A1* | 6/2016 | Bufe | H04L 67/535 715/746 |
| 2016/0359664 A1* | 12/2016 | Malegaonkar | H04L 67/12 |
| 2017/0193233 A1* | 7/2017 | Lorini | H04L 63/062 |
| 2019/0079898 A1 | 3/2019 | Xiong et al. | |
| 2020/0233598 A1* | 7/2020 | Bezugly | G06N 20/20 |
| 2021/0109971 A1* | 4/2021 | Zhong | G06N 3/08 |
| 2021/0390021 A1 | 12/2021 | Baughman et al. | |

OTHER PUBLICATIONS

Irfan, Mohammed Abdul et al. A Three-Layer Privacy Preserving Cloud Storage Scheme Based on Computational Intelligence in Fog Computing. Journal of Engineering Sciences, vol. 9, Issue 6, Jan. 2018, pp. 41-46.

Rajani, M. et al. Three-Layer Privacy Preserving Cloud Storage Scheme in Fog Computing. International Journal of Scientific Research & Engineering Trends, vol. 5, Issue 4, Jul.-Aug. 2019, pp. 1549-1553.

Krishnaveni, Y. et al. A Three-Layer Privacy Preserving Cloud Storage Scheme Based on Computational Intelligence in Fog Computing. International Journal of Emerging Technology in Computer Science & Electronics (IJETCSE), vol. 26, Issue 5, Aug. 2019, pp. 26-30.

Priyanka, Korra et al. A Three Layer Privacy Preserving Cloud Storage Scheme Based on Computational Intelligence in Fog Computing. International Journal for Recent Developments in Science & Technology, vol. 03, Issue 09, Sep. 2019, pp. 208-214.

Liu, Jing et al. Protection of Sensitive Data in Industrial Internet Based on Three-Layer Local/Fog/Cloud Storage. Security and Communication Networks, vol. 2020, Article ID 2017930, Apr. 2, 2020, pp. 1-16.

Dwivedi, Priya. NLP: Extracting the main topics from your dataset using LDA in minutes. Towards Data Science, Aug. 22, 2018. [7 printed pages] <https://towardsdatascience.com/nlp-extracting-the-main-topics-from-your-dataset-using-lda-in-minutes-21486f5aa925>.

Wahid, Mohammed Nazeh Abdul et al. A Comparison of Cryptographic Algorithms: DES, 3DES, AES, RSA and Blowfish for Guessing Attacks Prevention. Journal of Computer Science Applications and Information Technology, Aug. 10, 2018, pp. 1-7. https://symbiosisonlinepublishing.com/computer-science-technology/computerscience-information-technology32.pdf>.

Devlin, Jacob et al. BERT: Pre-training of Deep Bidirectional Transformers forLanguage Understanding. Cornell University arXiv, May 24, 2019. [16 printed pages] <https://arxiv.org/pdf/1810.04805.pdf>.

Topic Modeling with BERT, LDA, and Clustering. Kaggle, Accessed Apr. 14, 2021. [18 printed pages] <https://www.kaggle.com/dskswu/topic-modeling-bert-lda>.

Jackson, William. Why salted hash is as good for passwords as for breakfast. GCN.com, Dec. 2, 2013. [4 printed pages] <https://gcn.com/articles/2013/12/02/hashing-vs-encryption.aspx>.

Ismail, Kaya. Edge Computing vs. Fog Computing: What's the Difference? CMS Wire, Aug. 14, 2018. [4 printed pages] <https://www.cmswire.com/information-management/edge-computing-vs-fog-computing-whats-the-difference/>.

Manasa R. et al. Three Layer Privacy Preserving Using Fog Computing. Special Issue Published in Int. Jnl. of Advanced Networking & Applications (IJANA), 2019, pp. 152-155. <https://www.ijana.in/papers/43.pdf>.

Kavyashree Kavyashree M. B. et al. A Three-Layer Privacy Preserving Cloud Storage Scheme Based on Computational Intelligence in Fog Computing. International Research Journal of Engineering and Technology (IRJET), vol. 07, Issue 06, Jun. 2020, pp. 4601-4606. <https://www.irjet.net/archives/V7/i6/IRJET-V7I6854.pdf>.

Chandrasekar, I. Ajith et al. Privacy Preserving Cloud Storage Based on a Three Layer Security Model. International Research Journal of Engineering and Technology (IRJET), vol. 06, Issue 03, Mar. 2019, pp. 2478-2483. https://www.irjet.net/archives/V6/i3/IRJET-V6I3482.pdf>.

Mell, Peter et al. The NIST Definition of Cloud Computing. National Institute of Standards and Technology, U.S. Department of Commerce, NIST Special Publication 800-145, Sep. 2011, 7 pages.

Patent Cooperation Treaty International Searching Authority. Patent Cooperation Treaty International Search Report, Aug. 10, 2022. [9 printed pages].

* cited by examiner

DATA DISTRIBUTION AND SECURITY IN A MULTILAYER STORAGE INFRASTRUCTURE

BACKGROUND

The various embodiments described herein generally relate to data distribution and security in a multilayer storage infrastructure. More specifically, the various embodiments describe techniques of distributing and securing file data in a storage infrastructure having multiple layers, including a fog computing layer.

SUMMARY

The various embodiments described herein provide data distribution and security techniques. The various embodiments further provide data restoration techniques subsequent to data distribution. An associated computer-implemented method includes receiving file data associated with a user for storage in a managed services domain, applying an ensemble learning model to devise a data distribution technique for the file data based upon contextual information associated with the user, and encrypting the file data. The method further includes, based upon the data distribution technique, dividing the file data to store among a cloud computing layer, a fog computing layer, and a local computing layer by performing a hash transformation and applying at least one cyclic error correcting code. In an embodiment, the method further includes receiving a data access request associated with the file data, authenticating the data access request, and restoring the file data via decryption.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
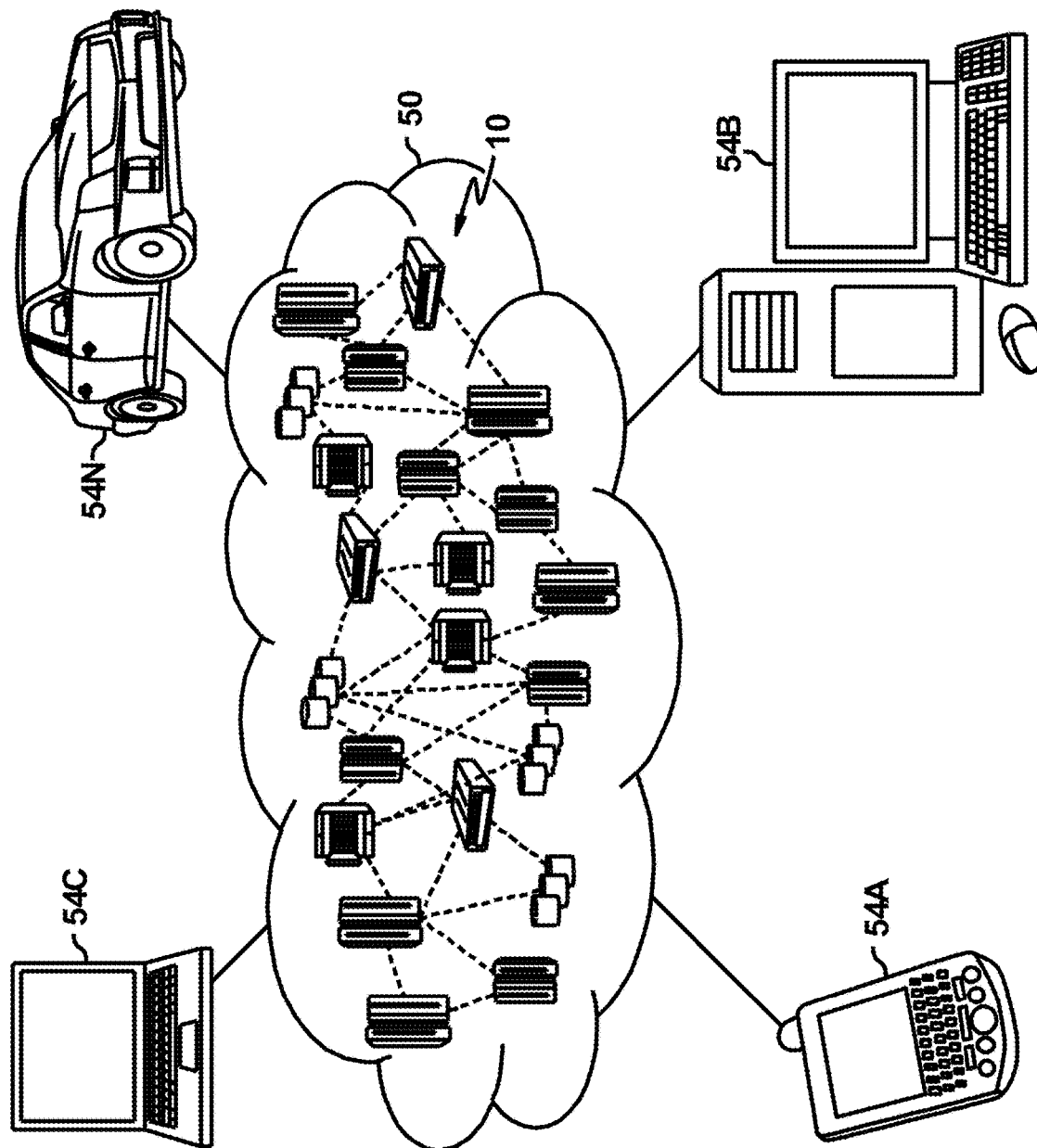
FIG. 1 depicts a cloud computing environment, according to one or more embodiments.

The various embodiments described herein are directed to techniques of data processing within a multilayer storage infrastructure incorporating a cloud computing layer, a fog computing layer, and a local computing layer. The various embodiments provide techniques for distributing and securing file data within a multilayer storage infrastructure. The various embodiments further provide techniques for restoring distributed and secured file data upon receipt of an authenticated request. The various embodiments further provide a data backup technique incorporating a data bin. In the context of the various embodiments, the cloud computing layer of a multilayer storage infrastructure includes a managed services domain associated with a cloud computing environment. A cloud computing environment is a virtualized environment in which one or more computing capabilities are available as a service. A cloud server system configured to implement data distribution and security techniques associated with the various embodiments described herein may utilize artificial intelligence capabilities of a machine learning knowledge model, specifically an ensemble learning model, as well as information of a knowledge base associated with such model.

The various embodiments may have advantages over conventional techniques. Conventional software as a service techniques may leave remote data vulnerable to security attacks and/or privacy breaches, e.g., in the event that there is an attack upon a datacenter and/or network infrastructure. The various embodiments improve computer technology by facilitating distribution of file data across multiple layers of a multilayer storage infrastructure, thus rendering it more difficult for an unauthorized user to access the entirety of the file data. Since data is divided among storage layers in accordance with the various embodiments, access to all layers is required in order to restore all file data across the layers. Accordingly, an unauthorized user would be unable to intercept a usable version of file data without accessing the entirety of the file data across all layers. Furthermore, the various embodiments facilitate inclusion of a data bin in a local storage layer of a multilayer storage infrastructure, thus enabling complete data recovery by an authorized user in the event file data is lost at one or more storage layers. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to data distribution and security in a multilayer storage infrastructure. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein is not limited to a cloud computing environment. Rather, the various embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a cloud computing environment 50, according to one or more embodiments. As shown, cloud computing environment 50 may include one or more cloud computing nodes 10 with which local computing devices used by cloud consumers, e.g., personal digital assistant or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer need not maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
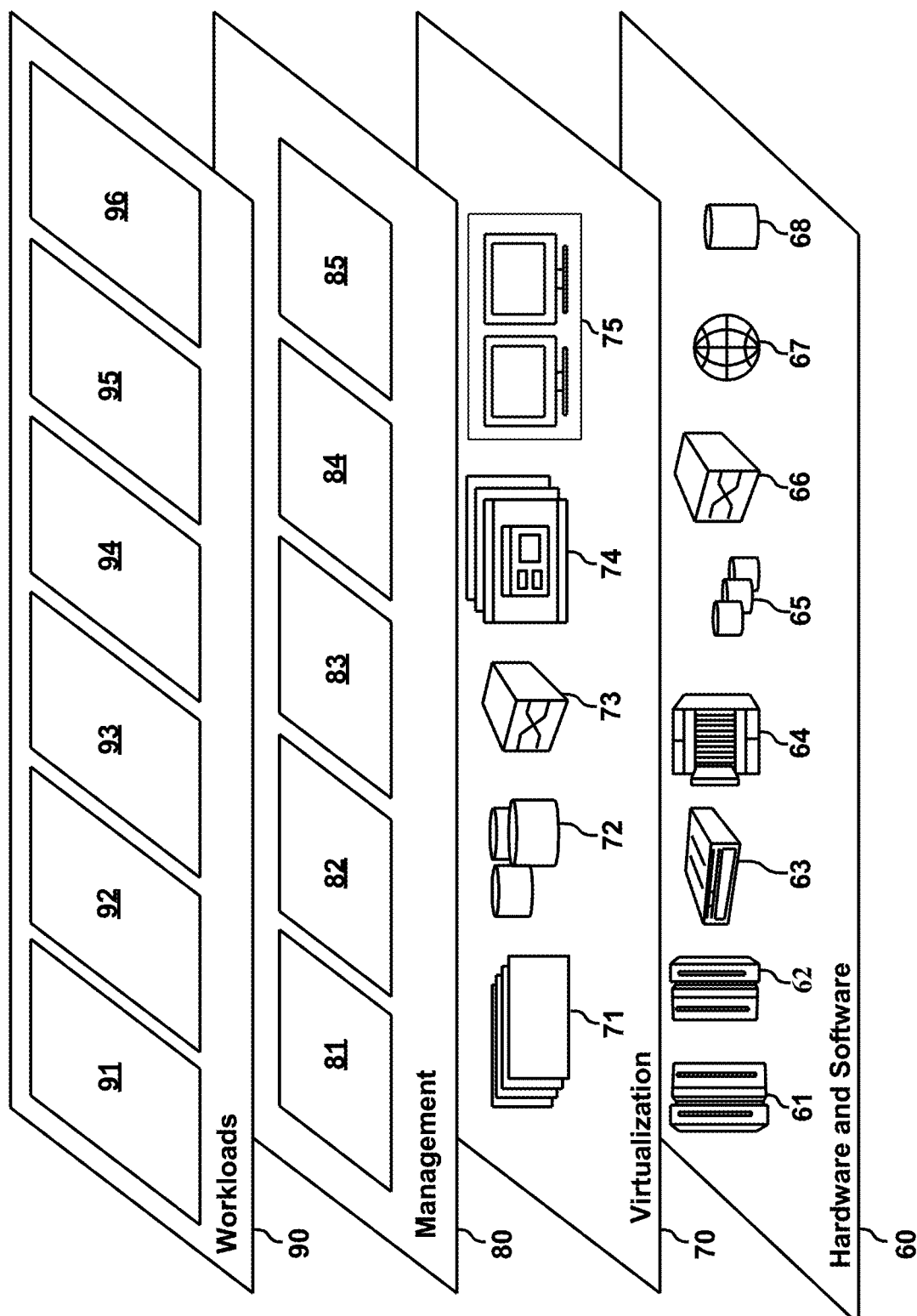
FIG. 2 depicts abstraction model layers provided by a cloud computing environment, according to one or more embodiments.

FIG. 2 illustrates a set of functional abstraction layers provided by cloud computing environment 50, according to one or more embodiments. The components, layers, and functions shown in FIG. 2 are intended to be illustrative only; the various embodiments described herein are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and data distribution and restoration 96. Data distribution and restoration 96 may enable distribution of file data among storage layers and restoration of such file data in response to an authenticated request in accordance with the various embodiments described herein.

Figure 3:
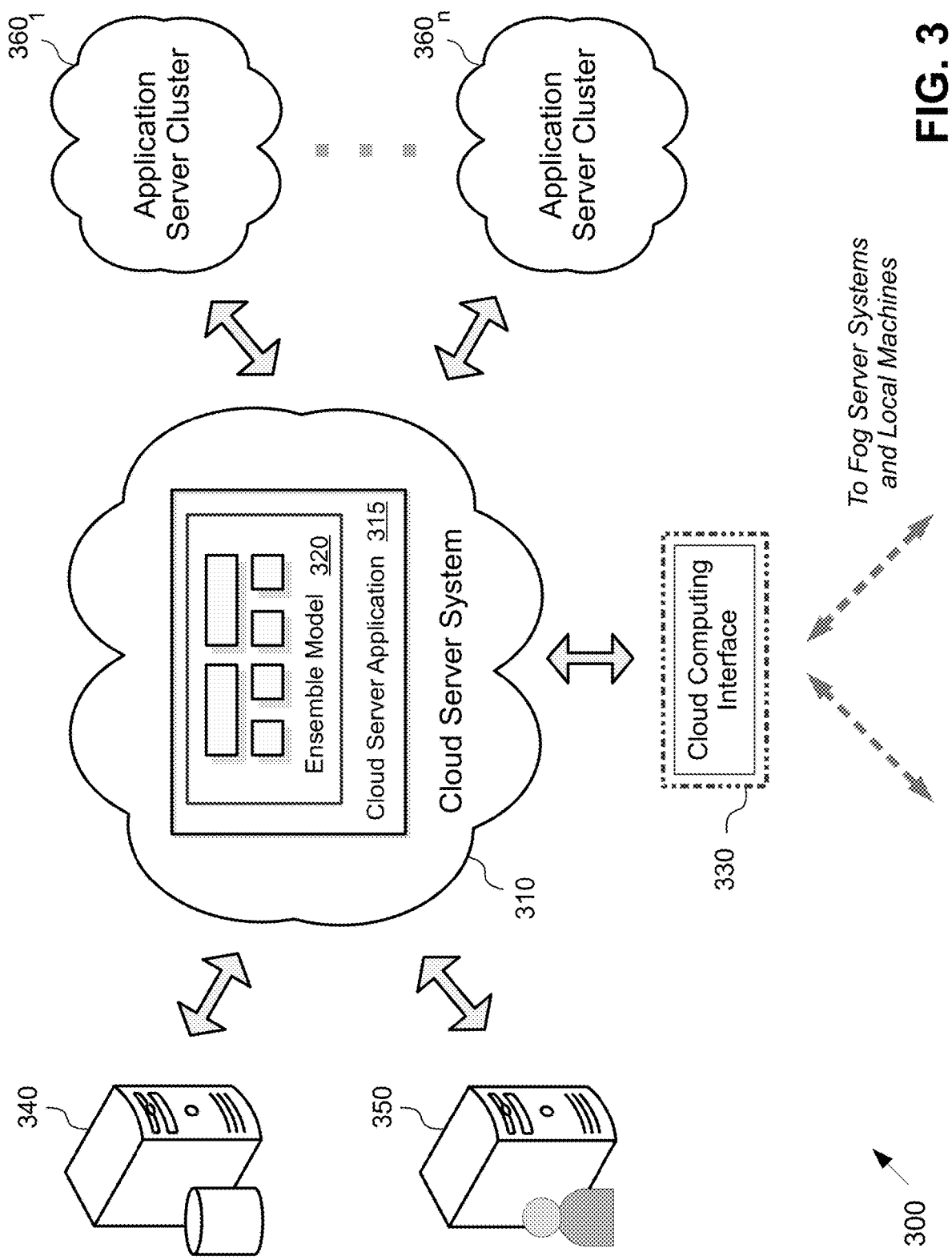
FIG. 3 depicts a managed services domain associated with a cloud computing environment, according to one or more embodiments.

FIG. 3 illustrates a managed services domain 300 within cloud computing environment 50. Functionality related to data distribution and restoration 96 and other workloads/functionality may be carried out in managed services domain 300. Managed services domain 300 includes cloud server system 310. In an embodiment, cloud server system 310 includes a cloud server application 315, which is configured to enable and/or facilitate data distribution and restoration in accordance with the various embodiments described herein. Cloud server application 315 is representative of a single application or a plurality of applications. Cloud server application 315 includes, or is otherwise operably coupled to, ensemble learning model 320. Furthermore, in an embodiment, managed services domain 300 includes one or more of a cloud computing interface 330, a database system 340, a directory server system 350, and a plurality of application server clusters $360_1$ to $360_n$. Cloud computing interface 330 enables communication between cloud server system 310 and one or more client systems that interact with managed services domain 300. As further described with respect to FIG. 4, cloud computing interface 330 enables communication with fog server system(s), local machine(s), and/or other components interfacing with managed services domain 300. Moreover, in an embodiment, cloud server system 310 is configured to communicate with database system 340, directory server system 350, and/or application server clusters $360_1$ to $360_n$. Additionally, application servers within application server clusters $360_1$ to $360_n$ may be configured to communicate with one another, with servers in other domains, and/or with other components interfacing with managed services domain 300.

Database system 340 optionally coordinates and manages a knowledge base of ensemble learning model 320. The knowledge base associated with ensemble learning model 320 optionally includes all repositories, ontologies, files, and/or documentation associated with the model and data processing associated therewith. Database system 340 may include one or more database servers, which may coordinate and/or manage various aspects of the knowledge base. Database system 340 stores relationships among ensemble learning model 320, the plurality of application server clusters $360_1$ to $360_n$, and the knowledge base. In an embodiment, database system 340 is managed via a database management system (DBMS), optionally a relational database management system (RDBMS). In a further embodiment, database system 340 includes one or multiple databases, some or all of which may be relational databases. In a further embodiment, database system 340 includes one or more ontology trees or other ontological structures.

Directory server system 350 facilitates client authentication in managed services domain 300, including client authentication with respect to one or more of application server clusters $360_1$ to $360_n$. For purposes of authentication with respect to one or more of a plurality of applications in managed services domain 300, a client may provide environment details and credentials relevant to such application(s). Application server clusters $360_1$ to $360_n$ store aspects of various applications as well as provide application services to one or more client systems. Cloud server application 315 as well as other data-gathering components of managed services domain 300 are configured to provide appropriate notice with respect to any user context data collection. One or more aspects of managed services domain 300 further are configured to provide a user an option to opt in or opt out of any such user context data collection at any time. Optionally, one or more aspects of managed services domain 300 further are configured to transmit at least one notification to any affected user on a user-designated basis, e.g., periodically or each time any such user context data collection occurs.

Figure 4:
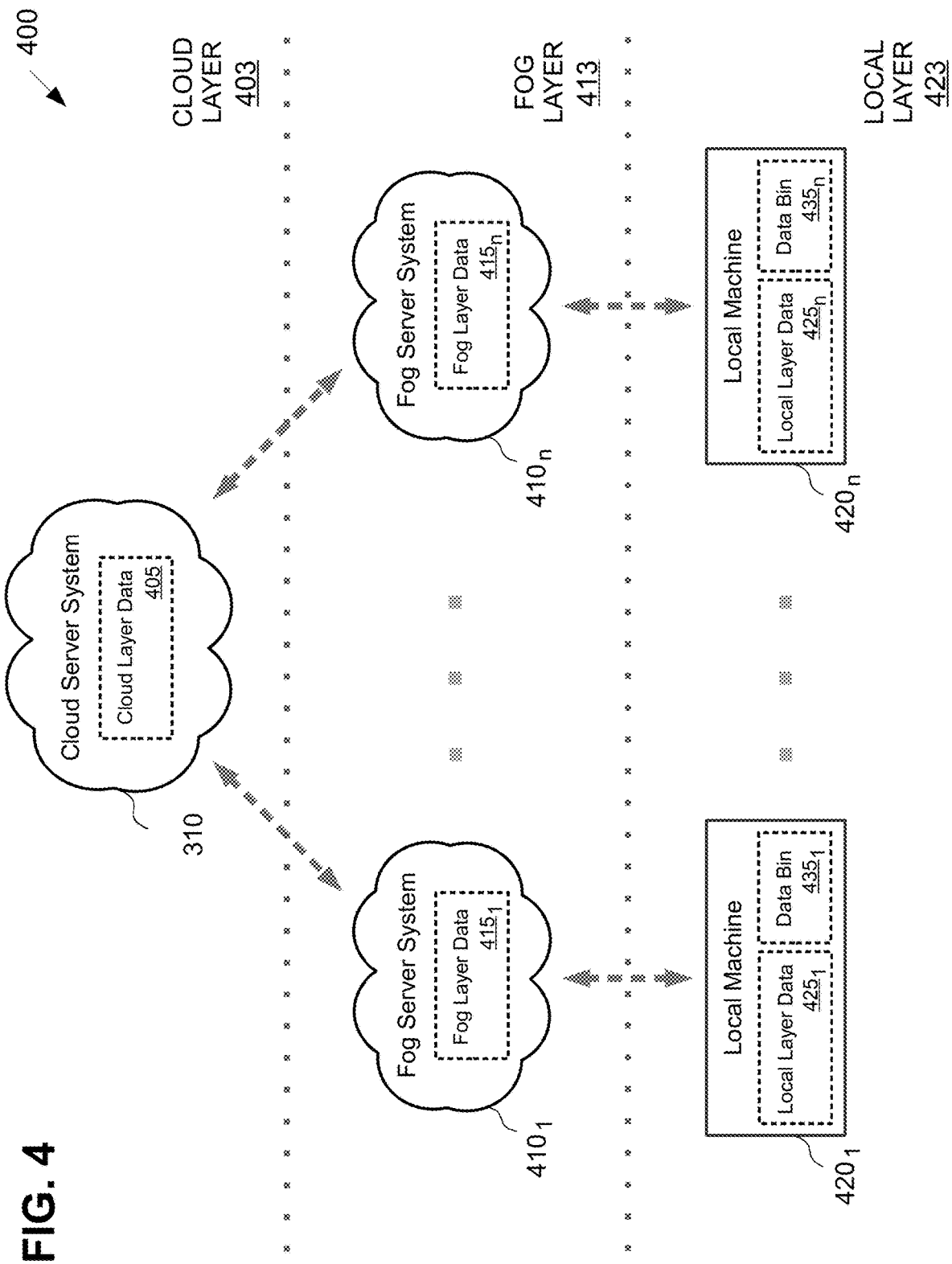
FIG. 4 depicts a multilayer storage infrastructure associated with a managed services domain, according to one or more embodiments.

FIG. 4 illustrates a multilevel storage infrastructure 400 including a cloud computing layer 403 (i.e., cloud layer), a fog computing layer 413 (i.e., fog layer), and a local computing layer 423 (i.e., local layer). Cloud layer 403 of multilevel storage infrastructure 400 includes, is operatively coupled to, and/or is communicatively coupled to cloud server system 310 and other aspects of managed services domain 300. Cloud server system 310 stores cloud layer data 405, which optionally includes file data distributed in accordance with the various embodiments described herein. Cloud server system 310 stores, or facilitates storage of, cloud layer data within one or more storage and/or database components associated with managed services domain 300, e.g., within one or more components described with respect to FIG. 3 and/or within one or more other hardware-based storage or database components that are optionally virtualized within cloud layer 403. Fog layer 413 of multilevel storage infrastructure 400 includes fog server systems $410_1$ to $410_n$. Fog server systems $410_1$ to $410_n$ respectively store fog server data $415_1$ to $415_n$, e.g., within one or more hardware-based storage or database components respectively associated with fog server systems $410_1$ to $410_n$. Such hardware-based storage or database components optionally are virtualized within fog layer 413. In an alternative configuration, fog layer 413 includes a single fog server system corresponding to one of or a combination of elements $410_1$ to $410_n$, storing fog layer data corresponding to one of or a combination of elements $415_1$ to $415_n$. In the context of the various embodiments described herein, fog computing within a fog layer, specifically fog layer 413 in the context of FIG. 4, refers to distributed computing involving one or more devices or systems peripheral to a cloud computing environment, located between cloud resources and local resources. Fog computing associated with such fog layer may serve as a decentralized intermediary between remote cloud computing associated with a cloud layer, specifically cloud layer 403 in the context of FIG. 4, and local computing devices or systems at a local layer, specifically local layer 423 in the context of FIG. 4. Fog computing permits aggregation of data associated with multiple devices into storage nodes having regional connectivity.

Local layer 423 of multilevel storage infrastructure 400 includes local machines $420_1$ to $420_n$. Each of local machines $420_1$ to $420_n$ is representative of or includes at least one device and/or system incorporating at least one hardware component. Local machines $420_1$ to $420_n$ respectively store local layer data $425_1$ to $425_n$, e.g., within one or more hardware-based storage or database components respectively associated with local machines $420_1$ to $420_n$. Furthermore, local machines $420_1$ to $420_n$ respectively include data bins $435_1$ to $435_n$, e.g., within one or more hardware-based storage or database components respectively associated with local machines $420_1$ to $420_n$. Each of fog server systems $410_1$ to $410_n$ optionally provides regional connectivity and/or data aggregation capabilities to one or more local machines $420_1$ to $420_n$. In an alternative configuration, local layer 423 includes a single local machine corresponding to one of or a combination of elements $420_1$ to $420_n$, storing local layer data corresponding to one of elements $425_1$ to $425_n$, and including (or being operatively coupled to) a data bin corresponding to one of or a combination of elements $435_1$ to $435_n$.

In an alternative configuration, multilevel storage infrastructure 400 includes further intermediate layers in addition to the aforementioned three layers, e.g., an intermediate layer between cloud layer 403 and fog layer 413 and/or an intermediate layer between fog layer 413 and local layer 423. Such intermediate layer(s) optionally buffer data for transmission among cloud layer 403, fog layer 413, and/or local layer 423. Additionally or alternatively, such intermediate layer(s) include characteristics of adjacent layers. For example, an intermediate layer between cloud layer 403 and fog layer 413 optionally incorporates certain aspects of both cloud layer 403 and fog layer 413. In another example, an intermediate layer between fog layer 413 and local layer 423 optionally incorporates certain aspects of both fog layer 413 and local layer 423.

In an embodiment, managed services domain 300 is a hybrid cloud interface that is communicably coupled to fog layer 413 of multilayer storage infrastructure 400 via at least one network connection. According to such embodiment, managed services domain 300 further is communicably coupled to at least one local machine associated with a user in local layer 423 of multilayer storage infrastructure 400, e.g., at least one of local machines $420_1$ to $420_n$, via at least one network connection, optionally via fog layer 413. According to such embodiment, fog layer 413 optionally is a component of a virtual private cloud within a hybrid cloud environment, in which an on demand pool of configurable resources is allocated to one or more designated users. In an additional embodiment, at least one local machine is communicably coupled to managed services domain 300 (specifically one or more components thereof) via an application programming interface (API) that facilitates cloud connectivity. In a further embodiment, at least one of the local machines $420_1$ to $420_n$ and one or more components of managed services domain 300 communicate via a data interchange format such as JavaScript Object Notation (JSON) or Extensible Markup Language (XML). In a further embodiment, at least one of local machines $420_1$ to $420_n$ is an edge computing device. According to such further embodiment, if file data to processed in accordance with the various embodiments pertains to data collected from a sensor or a distributed computing location, e.g., in the context of an Internet of Things (IoT) infrastructure, such local machine may interface with cloud layer 403 and/or fog layer 413 via an edge computing device. Including at least one of local machines $420_1$ to $420_n$ as an edge computing device enables a fog-edge computing hybrid implementation within multilayer storage infrastructure 400, thus providing local system benefits of edge computing with the interconnectivity and aggregation capabilities of fog computing.

Figure 5:
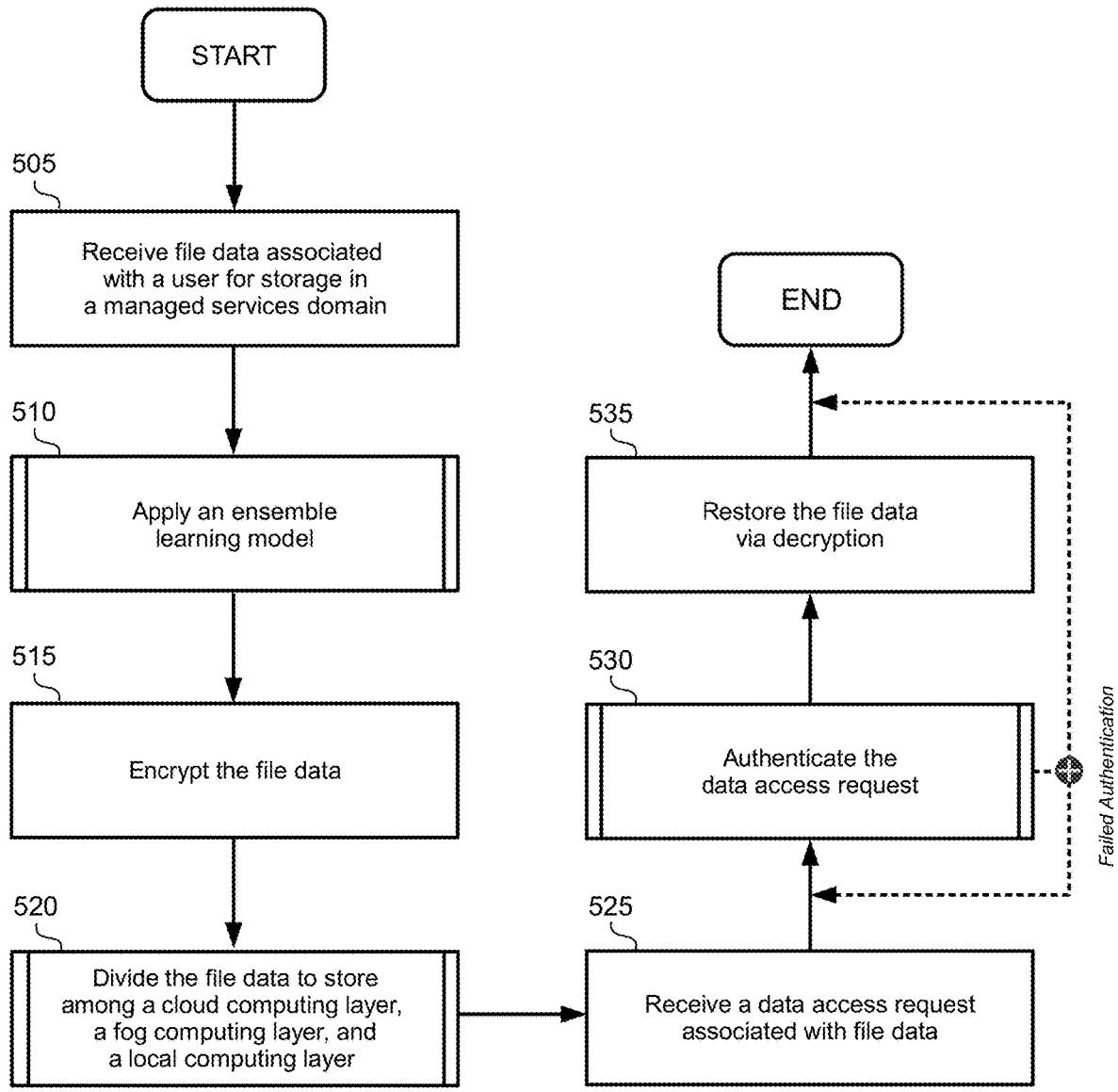
FIG. 5 illustrates a method of processing file data, according to one or more embodiments.

FIG. 5 illustrates a method 500 of processing file data. Specifically, the method 500 pertains to encrypting and distributing file data among storage layers of a multilayer storage infrastructure (e.g., multilayer storage infrastructure 400) and further pertains to decrypting and restoring the file data responsive to receipt of an authenticated data access request. In an embodiment, one or more steps associated with the method 500 are carried out in an environment in which computing capabilities are provided as a service (e.g., cloud computing environment 50). According to such embodiment, one or more steps associated with the method 500 are executed in a managed services domain within the environment (e.g., managed services domain 300). The environment optionally is a hybrid cloud environment. In a further embodiment, one or more steps associated with the method 500 are executed in one or more other environments, such as a client-server network environment or a peer-to-peer network environment. A centralized cloud server system in a managed services domain (e.g., cloud server system 310 in managed services domain 300) may facilitate processing according to the method 500 and the other methods further described herein. More specifically, a cloud server application in the cloud server system (e.g., cloud server application 315) may execute or facilitate execution of one or more steps of the method 500 and the other methods described herein. The data processing techniques facilitated or otherwise carried out via the cloud server system in the managed services domain may be associated with a data distribution and restoration workload within a workloads layer among functional abstraction layers provided by the environment (e.g., data distribution and restoration 96 within workloads layer 90 of cloud computing environment 50). In a further embodiment, the cloud server application executes one or more steps of the method 500 and other methods described herein via one or more programming instructions encoded via a high-level programming language, e.g., Python, C, C++, and/or C#.

The method 500 begins at step 505, where the cloud server application receives file data associated with a user for storage in a managed services domain. The received file data optionally is data that the user or an associated entity aims to store within the multilayer storage infrastructure for purposes of privacy, accessibility, and/or security. In an embodiment, the received file data is from a single file. Alternatively, the received file data is from a plurality of files. In an embodiment, the cloud server application receives the file data within the managed services domain, optionally via a cloud computing interface (e.g., cloud computing interface 330). According to such embodiment, the cloud server application receives and proceeds to process the received file data within the cloud server system. In a further embodiment, the cloud server application receives the file data at step 505 via a client interface associated with the user. According to such further embodiment and other embodiments described herein, the client interface is a user interface in the form of a graphical user interface (GUI) and/or a command line interface (CLI) presented via at least one client application installed on or otherwise accessible to a user system or device within the multilayer storage infrastructure (e.g., one of local machines $420_1$ to $420_n$ within multilayer storage infrastructure 400) or operatively/communicably coupled to the multilayer storage infrastructure.

At step 510, the cloud server application applies an ensemble learning model (e.g., ensemble learning model 320) to devise a data distribution technique for the file data based upon contextual information associated with the user. In the context of the various embodiments described herein, an ensemble learning model incorporates a plurality of artificial intelligence techniques, including machine learning techniques and optionally deep learning techniques, functioning collaboratively in order to identify topics and/or groups of topics associated with the file data and to classify the file data based upon such topic identification. The plurality of artificial intelligence techniques may include one or more natural language processing (NLP) models and/or one or more multi-class classification techniques. In the context of the various embodiments described herein, the data distribution technique divides the file data among the storage layers of the multilayer storage infrastructure and further distributes redundant data among the storage layers in order to preserve dependencies necessary for file data restoration and/or transfer. The cloud server application devises the data distribution technique based upon the topic identification and classification accomplished via the ensemble learning model. The data distribution technique allocates portions of the file data or subportions thereof to respective storage layers. As further described herein, the respective storage layers optionally are correlated with respective data buckets into which the cloud server application divides the file data. In the context of the various embodiments, a data bucket is a data structure configured to store distributed data. A data bucket optionally is or includes a container or buffer.

During application of the ensemble learning model according to step 510, the cloud server application topically analyzes the received file data in view of the contextual information associated with the user. In an embodiment, the contextual information associated with the user is based upon historical and/or currently observed user patterns of application access and data access as well as various attributes associated with the user. According to such embodiment, the cloud server application optionally applies the ensemble learning model to devise the data distribution technique based at least in part upon one or more of a plurality of user contextual factors. The plurality of user contextual factors optionally include user frequency of data use, user frequency of application use, user system configuration, user file storage pattern, user attributes (e.g., user profession, organization(s) affiliated with the user, individual or business contacts of the user), and/or user data content (e.g., user data file type and/or size) associated with historically, recently, or currently used applications or files. A method with regard to applying the ensemble learning model according to step 510 is described with respect to FIG. 6.

At step 515, the cloud server application encrypts the file data. The cloud server application encrypts the file data in order to prepare for implementation of the data distribution technique devised at step 510. In an embodiment, the cloud server application devises an encryption strategy incorporating one or more encryption techniques based upon the user contextual information, e.g., based upon security and/or privacy settings associated with such information. Additionally or alternatively, the cloud server application devises the encryption strategy based upon data type(s) or data sizes associated with the file data and/or portions of the file data. In an additional embodiment, the cloud server application completes encryption according to step 515 prior to further file data processing to avoid security risks associated with data interception, e.g., a man in the middle (MitM) attack. According to such additional embodiment, the cloud server application encrypts the file data prior to dividing the file data according to the devised data distribution technique. Additionally or alternatively, the cloud server application encrypts the file data prior to performing any hash transformation. In a further embodiment, the cloud server application applies a first iteration of encryption to the file data in its entirety and then applies one or more subsequent iterations of encryption to respective file data portions to be distributed among layers of the multilevel storage infrastructure as determined via the ensemble learning model. In a further embodiment, the one or more encryption techniques associated with the encryption strategy include symmetric-key algorithms such as the Triple Data Encryption Algorithm (TDES) and the Advanced Encryption Standard algorithm (AES). According to such further embodiment, the cloud server application optionally encrypts the file data by applying TDES. Additionally or alternatively, the cloud server application optionally encrypts the file data by applying AES. In a further embodiment, the one or more encryption techniques include asymmetric-key algorithms such as Rivest-Shamir-Adleman (RSA). In a further embodiment, the cloud server application applies a plurality of encryption algorithms to all or certain portions of the file data for enhanced security and/or privacy. According to such further embodiment, the cloud server application optionally applies a relatively stronger encryption algorithm and/or a greater number of encryption algorithms to the file data and/or portions of the file data marked as confidential or otherwise associated with confidential data as opposed to nonconfidential data.

At step 520, based upon the data distribution technique devised at step 510, the cloud server application divides the file data as encrypted at step 515 to distribute and store among storage layers of the multilayer storage infrastructure. According to step 520, the cloud server application implements the devised data distribution technique. In an embodiment, the cloud server application divides the file data among a cloud computing layer, a fog computing layer, and a local computing layer of the multilayer storage infrastructure (e.g., cloud layer 403, fog layer 413, and local layer 423 of multilayer storage infrastructure 400). In an alternative embodiment, the cloud server application divides the file data among one or more intermediate layers in addition to the cloud layer, the fog layer, and the local layer. Such one or more intermediate layers may include an intermediate layer between the cloud layer and the fog layer that optionally incorporates certain aspects of both the cloud layer and the fog layer. Additionally or alternatively, such one or more intermediate layers may include an intermediate layer between the fog layer and the local layer that optionally incorporates certain aspects of both the fog layer and the local layer. By dividing the file data among the storage layers, the cloud server application completes distribution of the file data portions per the devised data distribution technique.

In the context of dividing the file data according to step 520, the cloud server application performs a hash transformation and applies at least one cyclic error correcting code. The cloud server application performs the hash transformation via application of one or more cryptographic hash functions. In an embodiment, the cloud server application performs the hash transformation by applying the MD5 message-digest algorithm (MD5). In an additional embodiment, the cloud server application performs the hash transformation by applying the Secure Hash Algorithm 2 (SHA-2). In a further embodiment, the cloud server application performs the hash transformation by applying a plurality of cryptographic hash functions, e.g., joint application of MD5 and SHA-2. The cloud server application applies the one or more cryptographic hash functions to generate a hash value in bit array form. In a further embodiment, cloud server application adds further security in the context of generating a hash value by randomizing such hash value through addition of a random string, i.e., a salt, to a file data string to be hashed prior to generating the hash value. In a further embodiment, the cloud server application performs the hash transformation by separately hashing file data divided among each of the storage layers of the multilayer storage infrastructure, such that separate hash values are generated for string(s) of file data parts respectively distributed among the storage layers. Specifically, the cloud server application optionally generates a first set of hash values for file data distributed to the cloud computing layer, a second set of hash values for file data distributed to the fog computing layer, and a third set of hash values for file data distributed to the local computing layer. According to such further embodiment, the cloud server application optionally applies different respective cryptographic hash functions to generate the respective hash value sets responsive to different security requirements at the respective computing layers. In a further embodiment, the cloud server application integrates the hash transformation and error correction codes into a single algorithm or procedure. In a further embodiment, the cloud server application applies the at least one cyclic error correction code by applying at least one error correction code among the class of Bose-Chaudhuri-Hocquenghem (BCH) error correction codes, i.e., by applying at least one BCH error correction code. According to such further embodiment, the cloud server application optionally applies a Reed-Solomon subset of BCH error correcting codes. A method with regard to dividing the file data according to step 520 is described with respect to FIG. 10.

In an embodiment, the cloud server applies the ensemble learning model, encrypts the file data, and/or divides the file data among the storage layers according to steps 510-520 by executing a bash script including a series of tasks and subtasks related to the method steps. More specifically, the cloud server application encrypts the file data by running such bash script based upon output of the ensemble learning model. In the context of the various embodiments, a bash script is a file including a series of commands to facilitate command line program execution. According to such embodiment, the bash script facilitates execution of an automation technique that combines all aspects of the ensemble learning process together with encryption and file data division. Hence, the cloud server application optionally executes a bash script to automate process flow in the context of one or more of the various embodiments. In an additional embodiment, the cloud server application further stores the file data undivided in its entirety in a hardware-based or virtualized data bin associated with a local machine of the user (e.g., one of data bins $435_1$ to $435_n$ associated with one of local machines $420_1$ to $420_n$ within multilayer storage infrastructure 400). According to such embodiment, the cloud server application is capable of restoring the file data via the data bin responsive to determining that the divided file data is lost among one or more layers of the multilayer storage infrastructure.

At step 525, the cloud server application receives a data access request associated with the file data. In an embodiment, the cloud server application receives the data access request via a client interface associated with the user. The client interface optionally is the same interface from which the file data is received at step 505 or alternatively is a separate client interface. At step 530, the cloud server application authenticates the data access request. The cloud server application optionally authenticates by utilizing a directory server system associated with the managed services domain (e.g., directory server system 350). In an embodiment, the cloud server application authenticates the data access request by applying one or more cryptographic hash functions, optionally in a manner analogous to application of the one or more cryptographic hash functions in the context of dividing the file data at step 520. Optionally, upon failure to authenticate the data access request, the cloud server application either repeats step 530 or proceeds to the end of the method 500. A method with regard to authenticating the data access request according to step 530 is described with respect to FIG. 11.

At step 535, the cloud server application restores the file data via decryption. In an embodiment, the cloud server application restores the file data divided among the storage layers of the multilayer storage infrastructure in a same format as originally constructed. Alternatively, the cloud server application restores the file data in an altered format according to user preference(s), e.g., in compressed format and/or in encoded format. In an additional embodiment, through use of a key, the cloud server application decrypts the file data by applying one or more decryption techniques corresponding to the one or more encryption techniques applied at step 515. In a further embodiment, responsive to determining that file data is lost among one or more storage layers (e.g., due to aspects of data in one or more of the storage layers being corrupted), the cloud server application restores the file data in its entirety by accessing a data bin having the file data stored in undivided form. In a further embodiment, the cloud server application executes one or more of steps 525-535 in a procedure separate from steps 505-520.

Figure 6:
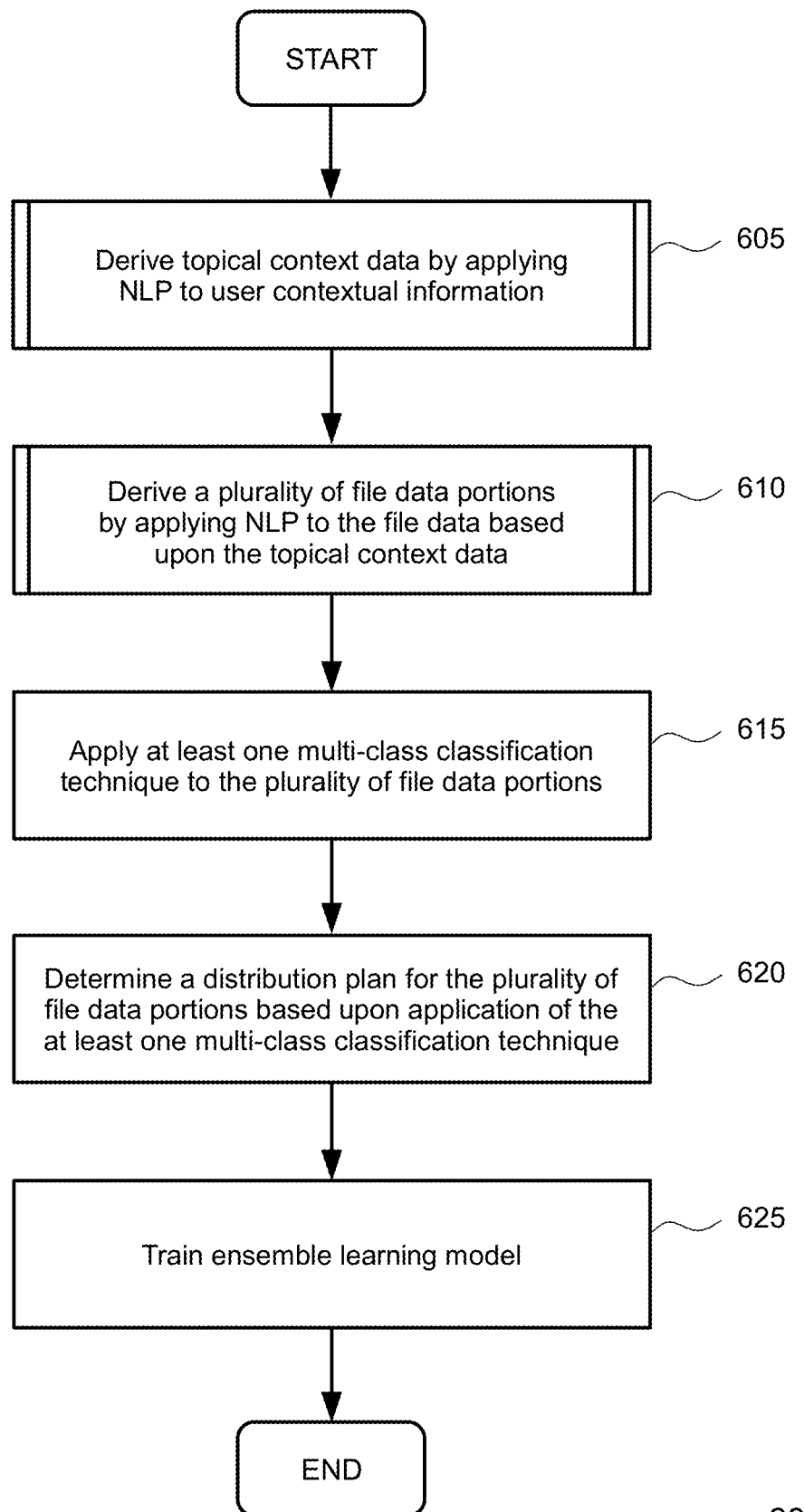
FIG. 6 illustrates a method of applying an ensemble learning model to devise a data distribution technique for file data based upon user contextual information, according to one or more embodiments.

FIG. 6 illustrates a method 600 of applying the ensemble learning model. The method 600 provides substeps in the context of step 510 of the method 500, according to one or more embodiments. The method 600 begins at step 605, where the cloud server application derives topical context data by applying NLP to the contextual information associated with the user. According to step 605, the cloud server application applies NLP to the user contextual information in order to derive the topical context data. The cloud server application applies one or more NLP models/algorithms to the user contextual information in order to derive the topical context data. The derived topical context data includes topics and/or groups of topics associated with the user contextual information. Such topics/groups of topics optionally include topics associated with one or more of the plurality of user contextual factors, e.g., topic(s) associated with user application activity, topic(s) associated with user data activity, topic(s) associated with user resource usage or user storage patterns, and/or topic(s) associated with user attributes such as user profession, user-affiliated organization(s), or user contact(s). Optionally, the derived topical context data further includes topical metadata describing associations between the user and the topics/groups of topics and/or describing associations among the topics/groups of topics. Specifically, the topical metadata may describe relational information between respective topics/groups of topics and user data, user application(s), and/or user attribute(s), e.g., date/time information or access information with regard to user data pertaining to a security-related topic.

The cloud server application applies unsupervised learning capabilities of the ensemble learning model via NLP to user context aspects identified within the user contextual information in order to identify topical patterns within the user contextual information. In an embodiment, the user context aspects include data aspects parsed or otherwise obtained from one or more of the plurality of user contextual factors. In an embodiment, the cloud server application optionally applies NLP to the user contextual information by incorporating at least one natural language understanding (NLU) technique. Additionally or alternatively, the cloud server application applies NLP to the user contextual information by incorporating at least one automatic speech recognition (ASR) technique. In a further embodiment, the cloud server application parses text from textual aspects of the user contextual information in order to identify user context aspects to which to apply NLP. Additionally or alternatively, the cloud server application identifies user context aspects for purposes of NLP analysis by applying audiovisual processing to audiovisual aspect(s) of the user contextual information. Upon identifying audio associated with the user (e.g., voice utterances of the user or associated contacts), the cloud server application optionally applies speech recognition (e.g., speech-to-text) in order to derive text-based aspects from the audio and subsequently applies NLP to the text-based aspects. Additionally or alternatively, upon identifying visual imagery associated with the user (e.g., still pictures and/or video of user activity or activity of associated contacts), the cloud server application optionally applies video recognition (e.g., video-to-text) in order to derive text-based aspects from the visual imagery and subsequently applies NLP to the text-based aspects. The cloud server application optionally applies one or more other forms of audiovisual processing to audio and/or visual imagery within the user contextual information in order to identify further user context aspects. In a further embodiment, the cloud server application derives user context aspects for purposes of NLP analysis by analyzing monitoring data collected in association with the user, e.g., consequent to collection of Internet of things (IoT) sensor data from a plurality of monitoring sensors attached to the user, attached to devices associated with the user, and/or mounted within an environment associated with the user. The cloud server application optionally applies NLP to textual aspects derived from the sensor data and/or sensor metadata.

In an embodiment, the cloud server application quantifies relevancy of topics among the derived topical context data by assigning respective user context scores to each topic and/or each group of topics. The user context scores indicate relative importance of each topic and/or each group of topics to the user in terms of file storage access. The cloud server application optionally prioritizes storage of data associated with a topic and/or a group of topics having a relatively higher user context score in order to facilitate relatively faster user access. Conversely, the cloud server application optionally permits more flexible storage of data associated with a topic and/or a group of topics having a relatively lower user context score, e.g., by permitting storage of such data at a location having relatively lower storage cost but resulting in relatively higher data access latency. According to such embodiment, the cloud server application optionally assigns respective user context scores on a predefined numerical scale, e.g., an integer scale from 0 to 100.

As further described herein, optionally the cloud server application encodes feature vectors based upon the topical patterns identified within the user contextual information and derives the topical context data based upon processing the encoded feature vectors, e.g., via application of at least one clustering algorithm. In the context of the various embodiments, a feature vector is an n-dimensional representation of a datapoint describing respective features of such datapoint in numerical format. In the context of the various embodiments, a datapoint is an entity represented within data, e.g., an individual, an organization, or an application aspect. In the context of the various embodiments, a feature is an measurable property or characteristic associated with a datapoint. A method with regard to deriving the topical context data according to step 605 is described with respect to FIG. 7.

At step 610, the cloud server application derives a plurality of file data portions by applying NLP to the file data based upon the topical context data derived at step 605.

According to step 610, the cloud server application applies NLP to the file data based upon the derived topical context data in order to derive the plurality of file data portions. Using as input the derived topical context data including topics/groups of topics associated with the user contextual information, the cloud server application applies unsupervised learning capabilities of the ensemble learning model via NLP to file data aspects in order to identify topical patterns among the file data. In an embodiment, the cloud server application optionally applies NLP to the file data by incorporating at least one NLU technique. Additionally or alternatively, the cloud server application applies NLP to the file data by incorporating at least one ASR technique. In a further embodiment, the cloud server application parses text from textual aspects of the file data in order to identify file data aspects to which to apply NLP. Additionally or alternatively, the cloud server application identifies file data aspects for purposes of NLP analysis by applying audiovisual processing to audiovisual aspect(s) within the file data. Upon identifying audio within the file data (e.g., voice utterances or other audio sounds), the cloud server application optionally applies speech recognition (e.g., speech-to-text) in order to identify text-based aspects from the audio and subsequently applies NLP to the text-based aspects. Upon identifying visual imagery within the file data (e.g., still pictures and/or video), the cloud server application optionally applies video recognition (e.g., video-to-text) in order to identify text-based aspects from the visual imagery and subsequently applies NLP to the text-based aspects. The cloud server application optionally applies one or more other forms of audiovisual processing to audio and/or visual imagery within the file data in order to identify further file data aspects.

As further described herein, based upon the topical patterns identified among the file data, the cloud server application optionally creates the plurality of file data portions and allocates datapoints within the file data to the plurality of file data portions, e.g., via application of at least one clustering algorithm. A method with regard to deriving the plurality of file data portions according to step 610 is described with respect to FIG. 9.

At step 615, the cloud server application applies at least one multi-class classification technique to the plurality of file data portions derived at step 610. In accordance with step 615, the cloud server application associates the derived file data portions and/or respective subportions thereof with one or more of a plurality of classes. Based upon topic labelling determined via NLP applied in steps 605-610, the cloud server application applies supervised learning capabilities of the ensemble learning model in order to associate the derived file data portions or respective subportions thereof with one or more of the plurality of classes. In an embodiment, the cloud server application applies a random forest classifier (RFC) decision tree ensemble. Additionally or alternatively, the cloud server application applies a support vector machine (SVM) model, optionally a SVM ensemble model. The cloud server application accomplishes supervised learning using as input the derived file data portions. Based upon processing at respective decision tree nodes associated with one or more of the at least one classification technique, the cloud server application generates an output including information identifying associations between the respective file data portions and one or more of the plurality of classes. In a related embodiment, the output includes a numerical output (e.g., an integer, binary, and/or one-hot encoded vector output) corresponding to or otherwise referencing one or more particular classes among the plurality of classes for a respective file data portion or subportion(s) thereof. In an additional related embodiment, the output includes data pertaining to distribution of the file data portions based upon the plurality of classes, e.g., statistical data and/or metadata associated with relationship(s) between the plurality of classes and a respective file data portion or subportion(s) thereof.

The cloud server application associates file data portions and/or respective subportions thereof with one or more of the plurality of classes according to step 615 based upon one or more specific aspects of the user contextual information, e.g., based upon one or more of the plurality of user contextual factors. In an embodiment, the cloud server application classifies file data portion(s) by incorporating multiple user context aspects, including one or more aspects pertaining to data use frequency, data relevance, data type, data size, data complexity, data confidentiality, and/or data priority in the context of a certain user task. In a further embodiment, the cloud server application classifies file data portion(s) based upon association with respective data types. Specifically, the cloud server application optionally classifies file data portion(s) having most frequently used data types (or having data associated with most frequently used applications) into one or more classes associated with the local layer, classifies file data portion(s) related to less frequently used data types into one or more classes associated with the fog layer, and classifies file data portion(s) related to least frequently used data types into one or more classes associated with the cloud layer. Additionally or alternatively, the cloud server application classifies file data portion(s) based upon data relevance. Specifically, the cloud server application optionally classifies file data portion(s) having data determined as most relevant to user activity into one or more classes associated with the local layer, classifies file data portion(s) having less relevant data into one or more classes associated with the fog layer, and classifies file data portion(s) having least relevant data into one or more classes associated with the cloud layer. Additionally or alternatively, the cloud server application classifies file data portion(s) based upon application relevance. Specifically, the cloud server application optionally classifies file data portion(s) related to applications most frequently used during user activity into one or more classes associated with the local layer, classifies file data portion(s) related to applications less frequently used during user activity into one or more classes associated with the fog layer, and classifies file data portion(s) related to applications least frequently used during user activity into one or more classes associated with the cloud layer. Additionally or alternatively, the cloud server application classifies file data portion(s) based upon file size. Specifically, the cloud server application optionally classifies file data portion(s) related to larger user file(s) into one or more classes associated with the cloud layer, classifies file data portion(s) related to more compact user file(s) into one or more classes associated with the fog layer, and classifies file data portion(s) related to the most compact user file(s) into one or more classes associated with the local layer.

In an additional embodiment, the cloud server application classifies less relevant, less compact, and/or less frequently used file data portion(s) or subportion(s) thereof into one or more classes associated with the cloud layer, classifies more relevant, more compact, and/or more frequently used file data portion(s) or subportion(s) thereof into one or more classes associated with the fog layer, and classifies most relevant, most compact, and/or most frequently used file data portion(s) or subportion(s) thereof into one or more classes associated with the local layer. Additionally or alternatively, the cloud server application classifies file data portion(s) of a more complex and/or confidential nature into one or more classes associated with the cloud layer for purposes of accessibility. Additionally or alternatively, the cloud server application classifies file data portion(s) having highest relative priority in the context of a user task into classes associated with all storage layers, to ensure user access to such file data portion(s) in any data storage scenario. Additionally or alternatively, the cloud server application classifies file data portion(s) or subportion(s) thereof required for remote data processing and/or associated with remote data access availability into one or more classes associated with the cloud layer and/or into one or more classes associated with the fog layer. Additionally or alternatively, the cloud server application classifies file data portion(s) or subportion(s) thereof associated with local resources into one or more classes associated with the local layer.

In a further embodiment, the cloud server application classifies respective file data portion(s) and/or subportion(s) thereof into one or more of the plurality of classes according to step 615 based at least in part upon respective user context scores assigned to each topic or group of topics among the derived topical context data. According to such further embodiment, the cloud server application optionally assigns respective file data portion(s) or subportion(s) thereof that are associated with a topic and/or a group of topics having a relatively higher user context score to one or more of the plurality of classes correlated to relatively higher storage priority, in order to facilitate relatively faster user access. Conversely, the cloud server application optionally assigns respective file data portion(s) or subportion(s) thereof that are associated with a topic and/or a group of topics having a relatively lower user context score to one or more of the plurality of classes correlated to more flexible storage settings.

The cloud server application classifies each file data portion into one or more of the plurality of classes according to step 615 based upon one or more classification techniques. In an embodiment, the one or more classification techniques classify with respect to storage layers associated with the multilayer storage infrastructure, e.g., the cloud layer, the fog layer, and the local layer. According to a first classification technique, each of the plurality of classes is associated with only one of the storage layers. Specifically, a first class is associated with the cloud layer, a second class is associated with the fog layer, and a third class is associated with the local layer. In accordance with the first classification technique, the cloud server application associates a file data portion to be distributed in its entirety to a certain layer among the storage layers with a single class associated with the certain layer (i.e., the cloud layer class, the fog layer class, or the local layer class). For instance, the cloud server application may associate a file data portion to be distributed in its entirety to the cloud layer with the cloud layer class. Conversely, the cloud server application associates a file data portion to be distributed among multiple layers with multiple classes among the plurality of classes based upon layer distribution. In such case, the cloud server application may subdivide such file data portion into respective subportions based upon associated class. For instance, the cloud server application may associate a file data portion to be distributed among the cloud layer and the fog layer with both the cloud layer class and the fog layer class, and in such case the cloud server application may identify a cloud layer subportion of the file data portion based upon its association with the cloud layer class and further may identify a fog layer subportion of the file data portion based upon its association with the fog layer class.

According to a second classification technique, each of the plurality of classes optionally is associated with one of the storage layers or a combination thereof. Specifically, a first class is associated with the cloud layer, a second class is associated with the fog layer, a third class is associated with the local layer, a fourth class optionally is associated with both the cloud layer and the fog layer, a fifth class optionally is associated with both the cloud layer and the local layer, a sixth class optionally is associated with both the fog layer and the local layer, and a seventh class optionally is associated with all of the cloud layer, the fog layer, and the local layer. In accordance with the second classification technique, as with the first classification technique the cloud server application the cloud server application associates a file data portion to be distributed in its entirety to a certain layer among the storage layers with a single class associated with the certain layer (i.e., the cloud layer class, the fog layer class, or the local layer class). Conversely, the cloud server application associates a file data portion to be distributed among multiple layers with a class reflective of each of the multiple layers. For instance, the cloud server application may associate a file data portion to be distributed among the cloud layer and the fog layer with the class associated with both the cloud layer and the fog layer.

In an embodiment, the cloud server application associates one or more numerical class values with each of the plurality of file data portions and/or respective subportions thereof. According to such embodiment, the cloud server application optionally creates an encoded feature vector that includes numerical data associating one or more numerical class values with a respective file data portion among the plurality of file data portions and/or subportion(s) thereof. In an alternative embodiment, in accordance with the one or more classification techniques, the cloud server application classifies with respect to intermediate layers associated with the multilayer storage infrastructure in addition to the cloud layer, the fog layer, and the local layer. According to such alternative embodiment, the one or more classification techniques include respective class(es) associated with an intermediate layer between the cloud layer and the fog layer and/or an intermediate layer between the fog layer and the local layer.

At step 620, the cloud server application determines a distribution plan for the plurality of file data portions based upon application of the at least one multi-class classification technique. The distribution plan determined at step 620 is an implementation of the data distribution technique devised consequent to step 510. In an embodiment, the cloud server application determines the distribution plan based upon classification of the file data portions via the at least one multi-class classification technique. Based on computational intelligence as discussed previously, the cloud server application computes distribution proportions of the file data stored at the respective layers of the multilevel storage infrastructure, e.g., the cloud layer, the fog layer, and local layer. The cloud server application optionally computes the distribution proportions based upon file data portion classification into the plurality of classes. In an additional embodiment, the cloud server application includes in the distribution plan a procedure for distributing the file data into respective buckets within the cloud layer, the fog layer, and the local layer. According to such additional embodiment, the cloud server application optionally designates a distribution order specifying in which order to distribute the file data into the respective buckets. According to one distribution order variation, the cloud server application may distribute the file data to the cloud layer bucket first, followed by distribution to the fog layer bucket, followed by distribution to the local layer bucket. According to an alternative distribution order variation, the cloud server application may distribute the file data to the cloud layer bucket first, followed by distribution to the local layer bucket, followed by distribution to the fog layer bucket. According to a further alternative distribution order variation, the cloud server application may distribute the file data to the fog layer bucket first, followed by distribution to the cloud layer bucket, followed by distribution to the local layer bucket. According to a further alternative distribution order variation, the cloud server application may distribute the file data to the fog layer bucket first, followed by distribution to the local layer bucket, followed by distribution to the cloud layer bucket. According to a further alternative distribution order variation, the cloud server application may distribute the file data to the local layer bucket first, followed by distribution to the cloud layer bucket, followed by distribution to the fog layer bucket. According to a further alternative distribution order variation, the cloud server application may distribute the file data to the local layer bucket first, followed by distribution to the fog layer bucket, followed by distribution to the cloud layer bucket. If the multilayer storage infrastructure includes intermediate layer(s), a distribution order optionally incorporates respective bucket(s) within the intermediate layer(s) in addition to the cloud layer bucket, the fog layer bucket, and the local layer bucket. In a further embodiment, the cloud server application appends ensemble learning metadata to the file data based upon NLP and multi-class classification applied in steps 605-615. According to such further embodiment, the cloud server application optionally utilizes the ensemble learning metadata to determine the distribution proportions among the layers of the multilayer storage infrastructure. The ensemble learning metadata optionally incorporates information related to the file data portions derived at step 610. Information related to a respective file data portion as optionally incorporated into the ensemble learning metadata includes file data portion size, data type(s) associated with the file data portion, any application(s) associated with the file data portion, topical classification(s) associated with the file data portion, and/or class(es) associated with the file data portion.

At step 625, the cloud server application trains the ensemble learning model based upon NLP and multi-class classification applied at steps 605-615. According to step 625, the cloud server application updates the ensemble learning model based upon aspects derived and/or determined consequent to model application. In an embodiment, the cloud server application stores one or more topical context data aspects based upon the topical context data derived at step 605 for future analysis with respect to the user and/or with respect to a user having similar data usage and/or application usage characteristics. According to such embodiment, the cloud server application optionally analyzes the one or more topical context data aspects and, based upon such analysis, identifies and stores topical context data patterns (e.g., topical patterns based upon one or more of the plurality of user contextual factors). The cloud server application optionally utilizes the stored topical context data patterns to facilitate future topical context data processing. In an additional embodiment, the cloud server application stores one or more file data aspects based upon the plurality of file data portions derived at step 610 in order to facilitate future organization of file data portions associated with the user or a user having similar data and/or application use characteristics. According to such additional embodiment, the cloud server application optionally analyzes the one or more file data aspects and, based upon such analysis, identifies and stores file data patterns (e.g., topical patterns among the file data or other file data patterns). The cloud server application optionally utilizes the stored file data patterns to facilitate future file data processing. In a further embodiment, the cloud server application stores one or more classification aspects determined at step 615 with respect to the derived plurality of file data portions. According to such further embodiment, the cloud server application optionally analyzes the one or more classification aspects and, based upon such analysis, identifies and stores classification patterns associating one or more classes with respective file data portions among the plurality of file data portions and/or subportions thereof. Specifically, the cloud server application optionally stores encoded feature vectors that associate numerical class values with respective file data portions among the plurality of file data portions and/or subportions thereof. The cloud server application optionally utilizes the stored classification patterns to facilitate future multi-class classification processing. In a further embodiment, the cloud server application trains the ensemble learning model based upon the ensemble learning metadata created and/or based upon patterns determined in the context of the method 600 and optionally stores such ensemble learning metadata and/or patterns in the knowledge base associated with the ensemble learning model.

In sum, applying the ensemble learning model according to the method 600 includes deriving topical context data by applying NLP to the contextual information associated with the user, deriving a plurality of file data portions by applying NLP to the file data based upon the topical context data, applying at least one multi-class classification technique to the plurality of file data portions, determining a distribution plan for the plurality of file data portions based upon application of the at least one multi-class classification technique, and training the ensemble learning model based upon the applied NLP and the applied at least one multi-class classification technique.

Figure 7:
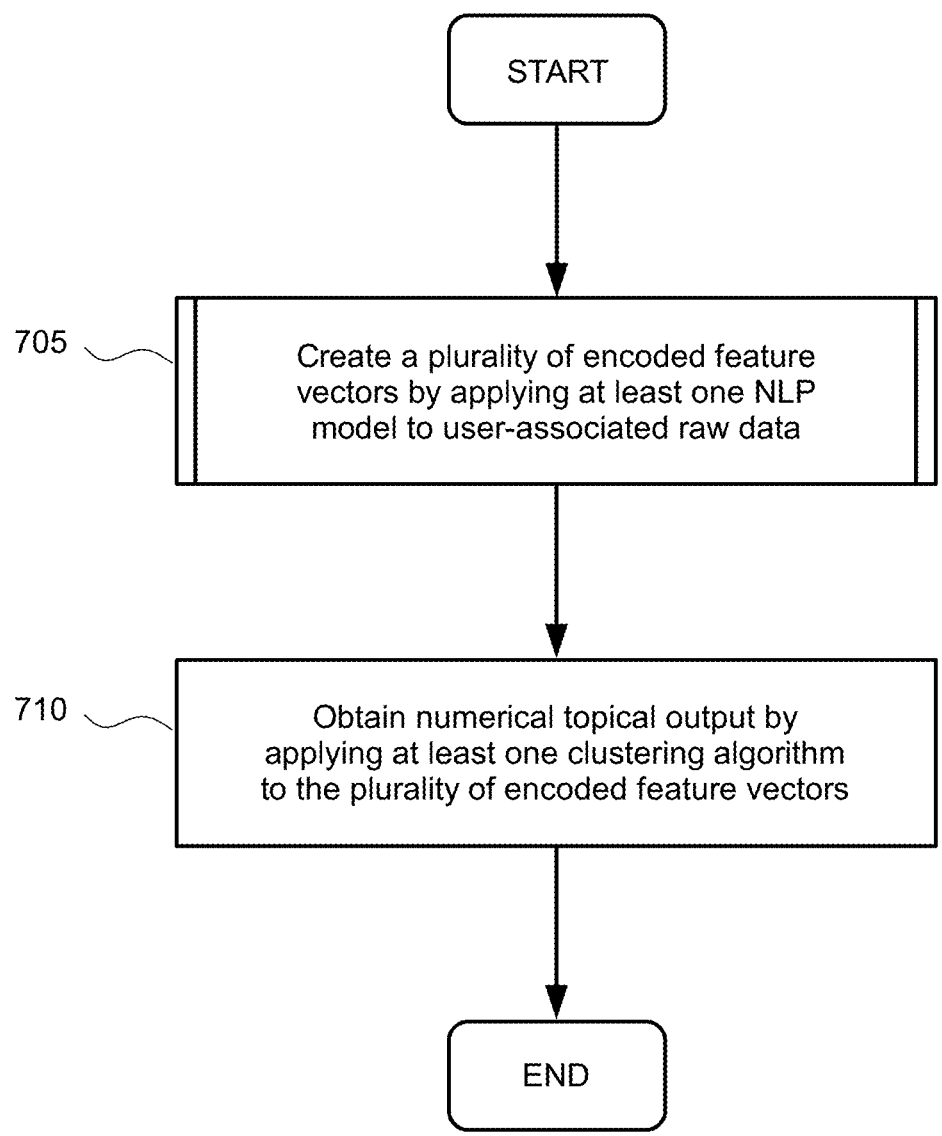
FIG. 7 illustrates a method of deriving topical context data by applying natural language processing (NLP) to user contextual information, according to one or more embodiments.

FIG. 7 illustrates a method 700 of deriving the topical context data. The method 700 provides substeps in the context of step 605 of the method 600, according to one or more embodiments. The method 700 begins at step 705, where the cloud server application creates a plurality of encoded feature vectors by applying at least one NLP model to raw data associated with the user. According to step 705, the cloud server application applies at least one NLP model to raw data associated with the user in order to create the plurality of encoded feature vectors. The cloud server application creates the plurality of encoded feature vectors based upon topical patterns identified among the raw data. Raw data associated with the user optionally includes unstructured data or structured data among the user contextual information that has not been NLP processed. In an embodiment, in the context of applying the at least one NLP model at step 705, the cloud server application applies a named entity recognition (NER) model to user context aspects. Such NER model processes the user contextual information by identifying and classifying entities in raw text among the raw data based upon topic. Application of an NER model results in at least one encoded topic assignment vector. In an additional embodiment, in the context of applying the at least one NLP model, the cloud server application applies latent Dirichlet allocation (LDA) to user context aspects in order to identify topics and relationships among text.

According to such additional embodiment, the cloud server application optionally applies LDA modelling to raw text among the raw data in order to topically classify datapoints represented within the raw text. Application of an LDA model results in at least one encoded topic assignment vector. In a further embodiment, in the context of applying the at least one NLP model, the cloud server application applies Bidirectional Encoder Representations from Transformers (BERT) to user context aspects. In applying BERT, the cloud server application applies to raw text among the raw data transformer-based NLP that utilizes a neural network attention technique. By utilizing neural network attention, the cloud server application enhances focus upon important aspects of raw text input in order to execute sentence embedding with respect to such input. Application of a BERT model results in at least one encoded real number vector based upon sentence embedding. In the context of the various embodiments, sentence embedding encompasses a set of techniques for mapping a sentence to a real number vector.

In a further embodiment, in the context of applying the at least one NLP model, the cloud server application applies a recurrent neural network (RNN) model to user context aspects in order to establish machine learning (deep learning) based connections among sequential datapoints associated with the user contextual information. Application of an RNN model results in at least one encoded feature vector reflecting a combination of topic and time series. According to such further embodiment, the cloud server application optionally utilizes a long short-term memory recurrent neural network (LSTM-RNN) architecture configured to store time series pattern data with respect to textual aspects associated with the raw data or the user contextual information more generally. The cloud server application optionally applies LSTM-RNN modeling for purposes of storing the time series pattern data. The cloud server application in the context of LSTM-RNN modeling stores usage characteristics as a function of time for each user context aspect usable as input for one or more of the at least one NLP model. Based upon usage characteristics with respect to the user context aspects over time, the cloud server application optionally uses LSTM-RNN data to determine patterns among the user context aspects. The determined patterns among the user context aspects optionally reflect user usage over time of one or more previously used (e.g., most recently used or recently used within a predetermined time period) applications, data types, or system resources. Specifically, using LSTM-RNN modeling, the cloud server application optionally derives at least one timestamped pattern with respect to one or more of the user context aspects, thus identifying captured data usage patterns, captured application usage patterns, and/or captured system resource usage patterns based upon timestamps. Application of an LSTM model results in an encoded time series pattern vector, and furthermore application of LSTM-RNN modelling results in encoded feature vector information reflecting both topic and time series. In a further embodiment, the cloud server application applies NLP to user context aspects among the raw data or the user contextual information more generally in conjunction with a gated recurrent unit (GRU) architecture. Application of GRU results in an encoded time series pattern vector based upon fewer parameters than LSTM. Optionally, in the context of applying the at least one NLP model, the cloud server application combines features of one or more of the aforementioned models beyond as described above.

In a further embodiment, the cloud server application assigns a weight value to each of the plurality of encoded feature vectors order to designate relative importance of the feature vectors created through application of each respective NLP model among the at least one NLP model at step 705. For instance, the cloud server application may assign a relatively higher weight value to an NEP-associated encoded feature vector and a relatively lower weight value to an LDA-associated encoded feature vector to indicate higher relative importance of NEP model application compared to LDA model application in a certain scenario. In a further embodiment, the cloud server application creates the plurality of encoded feature vectors by deriving data representations pertaining to application types or data types accessed by the user, frequency of application access or data access by the user, computing resource usage related to application access or data access by the user, and/or storage patterns related to application access or data access by the user. A method with regard to creating the plurality of encoded feature vectors according to step 705 is described with respect to FIG. 8.

At step 710, the cloud server application obtains numerical topical output by applying at least one clustering algorithm to the plurality of encoded feature vectors created at step 705. According to step 710, the cloud server application applies at least one clustering algorithm to the plurality of encoded feature vectors in order to obtain the numerical topical output. The plurality of encoded feature vectors created at step 705, or aspects thereof, are inputs to the at least one clustering algorithm. In an embodiment, the cloud server application concatenates one or more of the plurality of encoded feature vectors prior to applying the at least one clustering algorithm. In an additional embodiment, the cloud server application associates a respective feature of one of the plurality of encoded feature vectors with a respective topic based upon the numerical topical output obtained for the respective feature consequent to application of the at least one clustering algorithm. For instance, the cloud server application may associate a respective feature for which a numerical topical output value of "1" is obtained with a security-related topic, may associate a respective feature for which a numerical topical output value of "2" is obtained with a topic related to client engagement, may associate a respective feature for which a numerical topic output value of "3" with a topic related to quantum computing, etc. According to such additional embodiment, the cloud server application associates a datapoint among the raw data associated with the user with one or more respective topics based upon topical association of datapoint features as represented within the encoded feature vector representing the datapoint as created at step 705. For instance, the cloud server application may associate a datapoint among the raw data with a security-related topic and a topic related to client engagement based upon the datapoint having features that are associated with a security-related topic and a topic related to client engagement, as determined by the respective numerical topical output values obtained for such features. According to such additional embodiment, the cloud server application optionally derives a numerical topical output value of a datapoint among the raw data according to step 710 by concatenating or otherwise processing respective numerical topical output values of respective features of the datapoint. Such numerical topical output value of a datapoint optionally is represented as a feature vector, i.e., a clustering-derived supplement to the encoded feature vector representing the datapoint as created at step 705. In a further embodiment, the cloud server application optionally encodes respective values of the numerical topical output in binary form or in one-hot encoded form. In a further embodiment, the at least one clustering algorithm applied in the context of step 710 includes a k-means clustering algorithm. Additionally or alternatively, the at least one clustering algorithm includes an expectation-maximization algorithm. Additionally or alternatively, the at least one clustering algorithm includes a hierarchical clustering algorithm, e.g., agglomerative hierarchical clustering. Additionally or alternatively, the at least one clustering algorithm includes a mean shift clustering algorithm. In accordance with encoding and clustering per steps 705-710, the cloud server application associates features among the user contextual information with numerical topical information. The cloud server application in turn may utilize such numerical topical information to process and classify the file data received from the user.

In sum, deriving the topical context data according to the method 700 includes creating a plurality of encoded feature vectors by applying at least one NLP model to raw data associated with the user and obtaining numerical topical output by applying at least one clustering algorithm to the plurality of encoded feature vectors.

Figure 8:
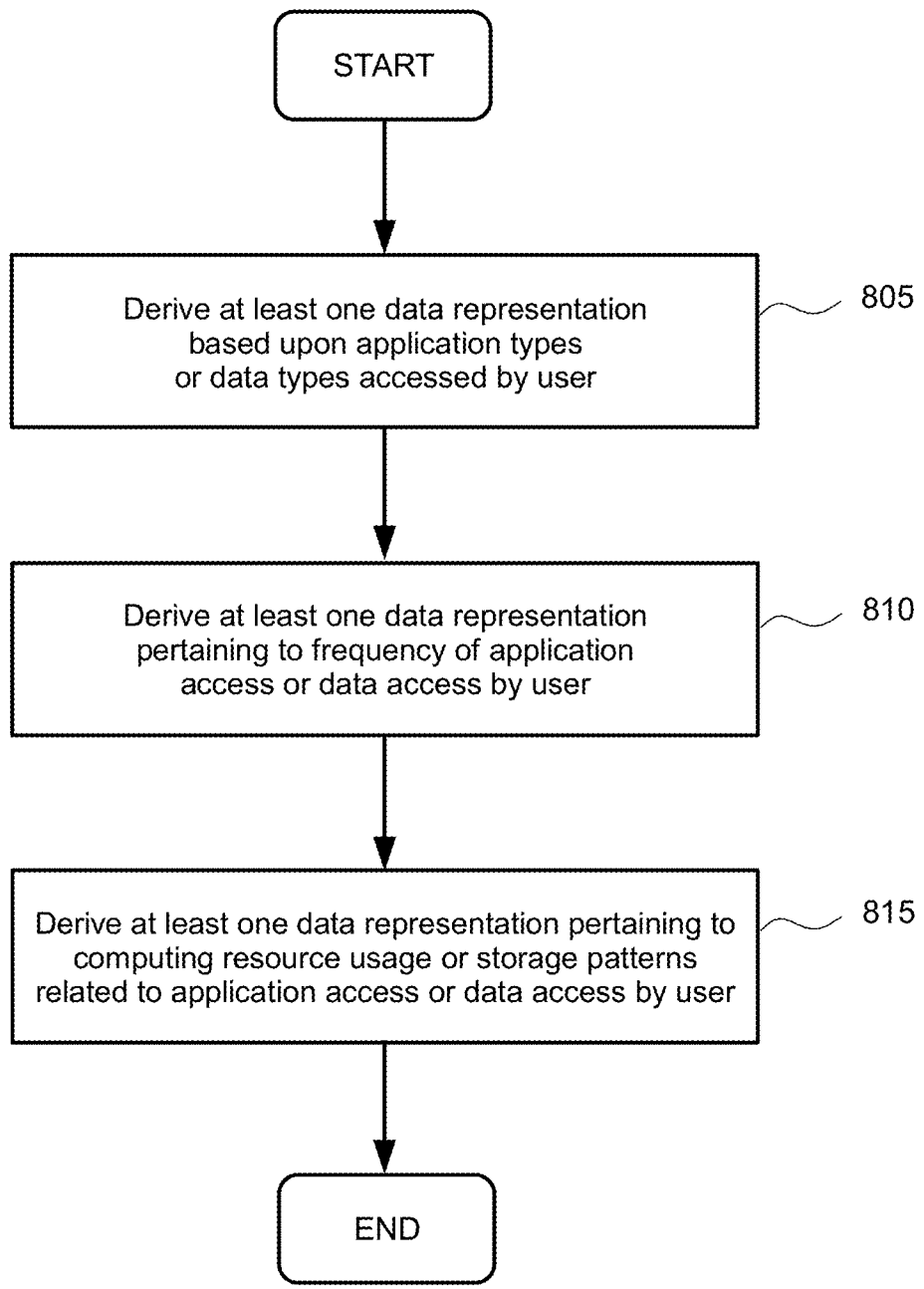
FIG. 8 illustrates a method of creating a plurality of encoded feature vectors, according to one or more embodiments.

FIG. 8 illustrates a method 800 of creating the plurality of encoded feature vectors. The method 800 provides substeps in the context of step 705 of the method 700, according to one or more embodiments. The method 800 begins at step 805, where the cloud server application derives at least one data representation based upon application types or data types accessed by the user. In an embodiment, the encoded vector representation includes an encoded feature vector set. The encoded feature vector set includes one or more encoded feature vectors. Optionally, the cloud server application derives the encoded feature vector set by deriving a binary vector (e.g., a bit array) based upon application access history via one hot encoding. According to such embodiment, one hot encoding enables representation of categorical variables in binary vector format. Additionally or alternatively, the cloud server application derives the encoded feature set via word embedding. In the context of the various embodiments, word embedding refers to assignment of respective numerical values to textual words based upon context, such that respective numerical values of words that are relatively more related are closer in value than respective numerical values of words that are relatively less related. In a related embodiment, the cloud server application applies word embedding to derive an encoded feature set that represents relatively more related words closer within a real-valued vector. In an additional related embodiment, the cloud server application applies word embedding to derive an encoded feature set that represents relatively more related data types associated with the user contextual information closer within a real-valued vector. In a further embodiment, the cloud server application associates datapoints with data types in attribute-value pair format.

At step 810, the cloud server application derives at least one data representation pertaining to frequency of application access or data access by the user. In an embodiment, the cloud server application encodes user access with respect to a particular application or particular datapoint(s) in attribute-value pair format. Such attribute-value pair format may associate a particular application/datapoint with a metadata scalar or vector value describing frequency of application/data use, date/time of application/data use, and/or other aspects of application/data use. In a further embodiment, the cloud server application encodes user access with respect to particular data type(s) in attribute-value pair format. Such attribute-value pair format may associate a particular data type with a metadata vector value describing frequency of data type use, date/time of data type use, and/or other aspects of data type use.

At step 815, the cloud server application derives at least one data representation pertaining to computing resource usage related to application access or data access by the user and/or storage patterns related to application access or data access by the user. In an embodiment, the cloud server application collects information pertaining to historical storage patterns with respect to data access by the user. For instance, the cloud server may record a storage pattern reflecting storage of frequently-used user application data across all storage layers. The cloud server application optionally stores such resource usage information and/or storage pattern information in a standardized encoded format, e.g., binary vector format and/or attribute-value pair format. The cloud server application incorporates the data representations derived in steps 805-815, or aspects thereof, into one or more of the plurality of encoded feature vectors. According to the various embodiments, the cloud server application optionally executes a subset of steps 805-815 and/or optionally executes steps 805-815 in any order.

In sum, creating the plurality of encoded feature vectors according to the method 800 includes deriving at least one data representation based upon application types or data types accessed by the user, deriving at least one data representation pertaining to frequency of application access or data access by the user, deriving at least one data representation pertaining to computing resource usage or storage patterns related to application access or data access by the user.

Figure 9:
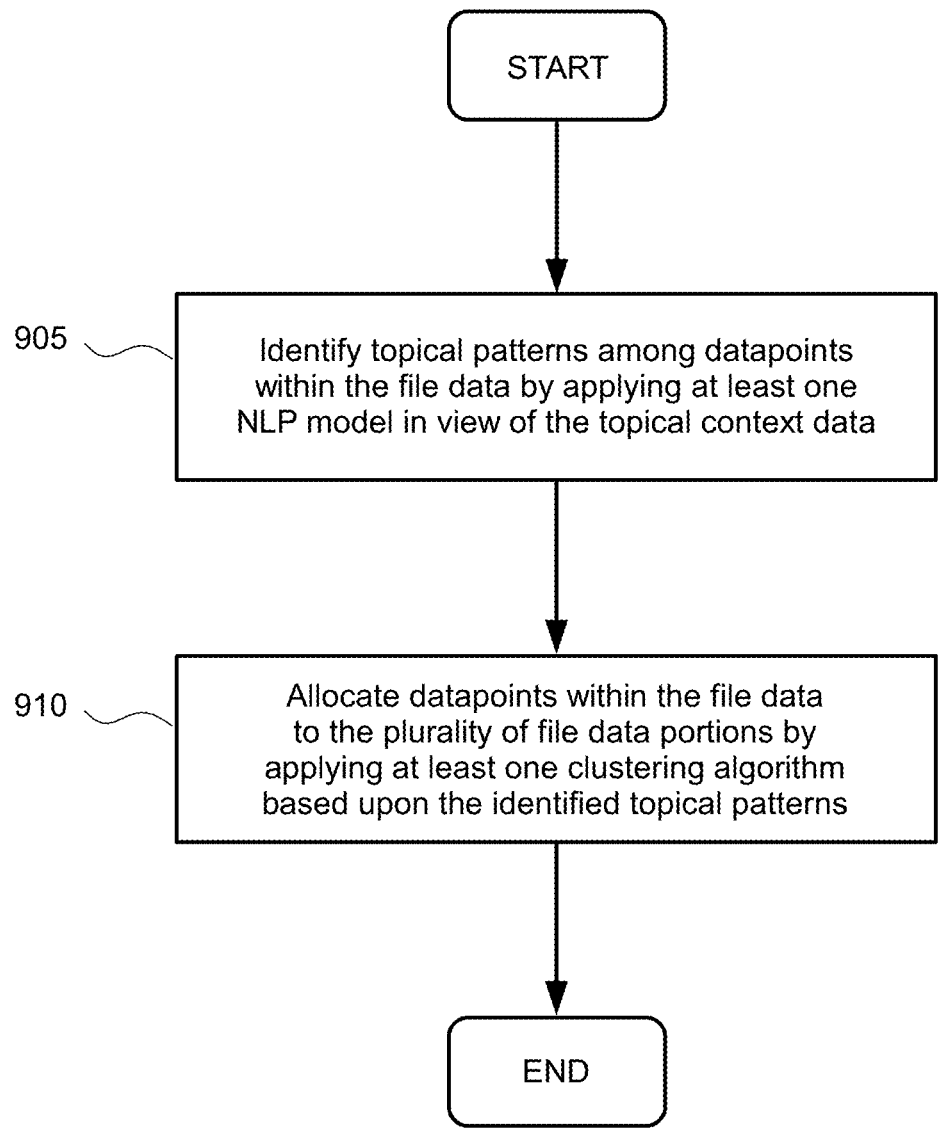
FIG. 9 illustrates a method of deriving a plurality of file data portions by applying NLP to file data based upon derived topical context data, according to one or more embodiments.

FIG. 9 illustrates a method 900 of deriving the plurality of file data portions. The method 900 provides substeps in the context of step 610 of the method 600, according to one or more embodiments. The method 900 begins at step 905, where the cloud server application identifies topical patterns among datapoints within the file data by applying at least one NLP model in view of the topical context data derived in accordance with step 605. According to step 905, the cloud server application applies at least one NLP model in view of the topical context data in order to identify the topical patterns. In an embodiment, the cloud server application derives topical information pertaining to the file data in view of the topical context data. According to such embodiment, the cloud server application optionally identifies file data portions by associating datapoints among the file data with topics or groups of topics within the topical context data. Specifically, based upon the topical context data, the cloud server application applies at least one NLP model to the file data in order to determine topical patterns among datapoints within the file data. In a related embodiment, the cloud server application associates respective features of file data datapoints with respective topic(s) based upon the identified topical patterns. For instance, the cloud server application may associate a feature of a file data datapoint with a security-related topic responsive to identifying a pattern between such feature and a corresponding feature in the topical context data associated with such security-related topic. According to such related embodiment, the cloud server application optionally associates file data datapoints with respective topic(s) based upon topical association of the features of such file data datapoints. For instance, responsive to determining based upon the identified topical patterns that features of a respective file data datapoint are associated with a security-related topic and a topic related to client engagement, the cloud server application may associate the respective file data datapoint with the security-related topic and the topic related to client engagement.

In an embodiment, in the context of applying the at least one NLP model at step 905, the cloud server application applies an NER model to file data aspects among the file data. Such NER model extracts information from the file data in view of the topical context data by identifying and classifying entities based upon topic. Based upon topic identification via the NER model, the cloud server application optionally identifies all datapoints or a subset of datapoints within the topical context data that are related to the file data. In a further embodiment, in the context of applying the at least one NLP model, the cloud server application applies LDA to identify topics and relationships among text within the file data. According to such further embodiment, the cloud server application optionally applies LDA modelling to file data aspects in view of the topical context data in order to topically classify datapoints represented within the file data. In a further embodiment, in the context of applying the at least one NLP model, the cloud server application applies BERT to file data aspects in view of the topical context data. In applying BERT, the cloud server application applies to text within the file data transformer-based NLP that utilizes a neural network attention technique. By utilizing neural network attention, the cloud server application enhances focus upon important aspects of raw text input in order to execute sentence embedding with respect to such input.

In a further embodiment, in the context of applying the at least one NLP model, the cloud server application applies an RNN model in order to establish machine learning based connections among sequential datapoints associated with the file data in view of the topical context data. According to such further embodiment, the cloud server application optionally utilizes an LSTM-RNN architecture configured to store time series pattern data with respect to file data aspects. The cloud server application optionally applies LSTM-RNN modeling for purposes of storing the time series pattern data. The cloud server application in the context of LSTM-RNN modeling stores usage characteristics as a function of time for each file data aspect usable as input for one or more of the at least one NLP model. Based upon usage characteristics with respect to the file data aspects over time, the cloud server application optionally uses LSTM-RNN data to predict patterns among the file data aspects, e.g., any determined relationships between file data patterns and user usage patterns over time. Specifically, using LSTM-RNN modeling, the cloud server application optionally derives at least one timestamped pattern with respect to one or more of the file data aspects. The cloud server application optionally identifies relationships between one or more of the file data aspects and one or more previously used applications, datapoints, or system resources and thus may associate such one or more file data aspects with usage patterns over time recorded with respect to the one or more previously used applications, datapoints, or system resources. Accordingly, in the context of deriving the file data portions, the cloud server application may associate such one or more file data aspects with one or more file data portions based at least in part upon such usage patterns. For instance, responsive to determining that file data aspects are associated with an application previously used (e.g., most recently used or recently used within a predetermined time period) by the user, the cloud server application may associate such file data aspects with one or more file data portions reflecting a compatibility or other association with such previously used application. In a further embodiment, the cloud server application applies NLP to file data aspects in view of the topical context data in conjunction with a GRU architecture. The cloud server application optionally combines features of one or more of the aforementioned models during application of NLP techniques. Based upon application of at least one NLP model in view of the topical context data, the cloud server application associates each datapoint within the file data with one or more identified topical patterns.

At step 910, the cloud server application allocates the datapoints within the file data to the plurality of file data portions by applying at least one clustering algorithm based upon the topical patterns identified at step 905. According to step 910, the cloud server application applies at least one clustering algorithm based upon the identified topical patterns in order to allocate the datapoints within the file data to the plurality of file data portions. Based upon the identified topical patterns associated with datapoints within the file data, which optionally are represented in encoded feature vector form, the cloud server application applies at least one clustering algorithm in order to allocate the datapoints to the plurality of file data portions based upon topical pattern correlations among the datapoints. The cloud server application optionally organizes each file data portion such that respective datapoints within each file data portion have certain topical pattern correlation(s) as determined via the at least one clustering algorithm. In an embodiment, the at least one clustering algorithm applied in the context of step 910 includes a k-means clustering algorithm. Additionally or alternatively, the at least one clustering algorithm includes an expectation-maximization algorithm. Additionally or alternatively, the at least one clustering algorithm includes a hierarchical clustering algorithm, e.g., agglomerative hierarchical clustering. Additionally or alternatively, the at least one clustering algorithm includes a mean shift clustering algorithm. In a further embodiment, the cloud server application assigns each of the plurality of file data portions a numerical value, e.g., an integer value, a binary value, or a one-hot encoded value. Optionally, the cloud server application assigns each of the plurality of file data portions a numerical value based upon respective numerical values associated with corresponding aspects within the topical context data derived at step 605. For instance, based upon the aforementioned example discussed with respect to step 710, the cloud server application may assign a numerical value of "1" to a file data portion including file data datapoints and features thereof that relate to security, may assign a numerical value of "2" to a file data portion including datapoints and features thereof that relate to client engagement, may assign a numerical value of "3" to a file data portion including datapoints and features thereof that relate to quantum computing, etc. Responsive to determining that a respective file data portion includes file data datapoints and features thereof relating to multiple topics, the cloud server application optionally assigns multiple numerical values to such file data portion corresponding to the multiple topics or alternatively assigns a single numerical value to such file data portion corresponding to a most relevant topic among the multiple topics.

In sum, deriving the plurality of file data portions according to the method 900 includes identifying topical patterns among datapoints within the file data by applying at least one NLP model in view of the topical context data and allocating the datapoints within the file data to the plurality of file data portions by applying at least one clustering algorithm based upon the identified topical patterns.

Figure 10:
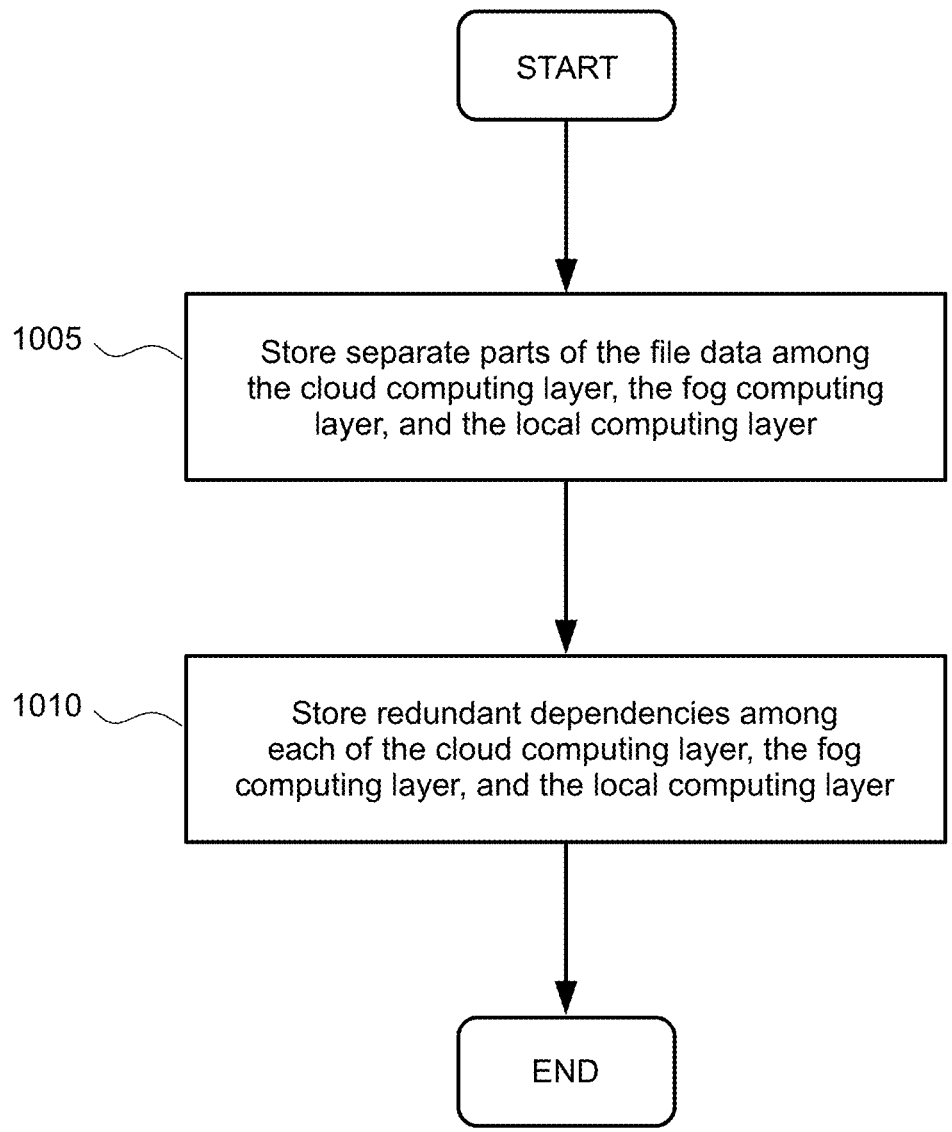
FIG. 10 illustrates a method of dividing file data, according to one or more embodiments.

FIG. 10 illustrates a method 1000 of dividing the file data. The method 1000 provides substeps in the context of step 520 of the method 500, according to one or more embodiments. The method 1000 begins at step 1005, where the cloud server application stores separate parts of the file data among the cloud computing layer, the fog computing layer, and the local computing layer of the multilayer storage infrastructure. In the context of the various embodiments, storing separate parts signifies storing non-redundant parts. In an embodiment, the cloud server application stores the data divided among the storage layers in buckets at the respective storage layers. According to such embodiment, the cloud server application stores cloud data in a cloud server bucket at the cloud layer, fog data in a fog server bucket at the fog layer, and local data in a local machine bucket at the local layer. Optionally, the cloud server application indexes the respective buckets based upon a bucket key value, such that file data portions or subportions having a same bucket key value are stored in a single bucket. The bucket key values for the respective buckets optionally correspond to or are otherwise related to class values assigned to file data portions or subportions. The cloud server application optionally designates or retrieves access control data with respect to each bucket. Bucket access control may be specified for the buckets via respective access control lists (ACLs). In a further embodiment, the cloud server bucket is the primary bucket, i.e., the location at which the cloud server application initiates division of the file data in accordance with the data distribution technique devised at step 510. According to such further embodiment, the cloud server application performs respective divisions upon the file data located in the primary bucket in order to store separate parts of the file data in buckets corresponding to other storage layers. The cloud server application optionally performs the respective divisions in succession or alternatively performs the respective divisions simultaneously. In an alternative embodiment, the cloud server application stores separate parts of the file data at step 1005 among one or more intermediate layers of the multilayer storage infrastructure in addition to the cloud layer, the fog layer, and the local layer. According to such alternative embodiment, the cloud server application optionally stores data classified for storage in an intermediate layer in an intermediate bucket associated with such intermediate layer.

At step 1010, the cloud server application stores redundant dependencies among each of the cloud computing layer, the fog computing layer, and the local computing layer of the multilayer storage infrastructure. The redundant dependencies stored among the layers include libraries related to execution of the file data, or portions/subportions thereof. Additionally or alternatively, the redundant dependencies include application packages associated with the file data or portions/subportions thereof. Additionally or alternatively, the redundant dependencies include information linking respective file data portions or subportions, e.g., to facilitate file data restoration or transfer. In an alternative embodiment, at step 1010 the cloud server application stores redundant dependencies among one or more intermediate layers of the multilayer storage infrastructure in addition to the cloud computing layer, the fog computing layer, and the local computing layer.

In sum, dividing the file data according to the method 1000 includes storing separate parts of the file data among the cloud computing layer, the fog computing layer, and the local computing layer and storing redundant dependencies among each of the cloud computing layer, the fog computing layer, and the local computing layer.

Figure 11:
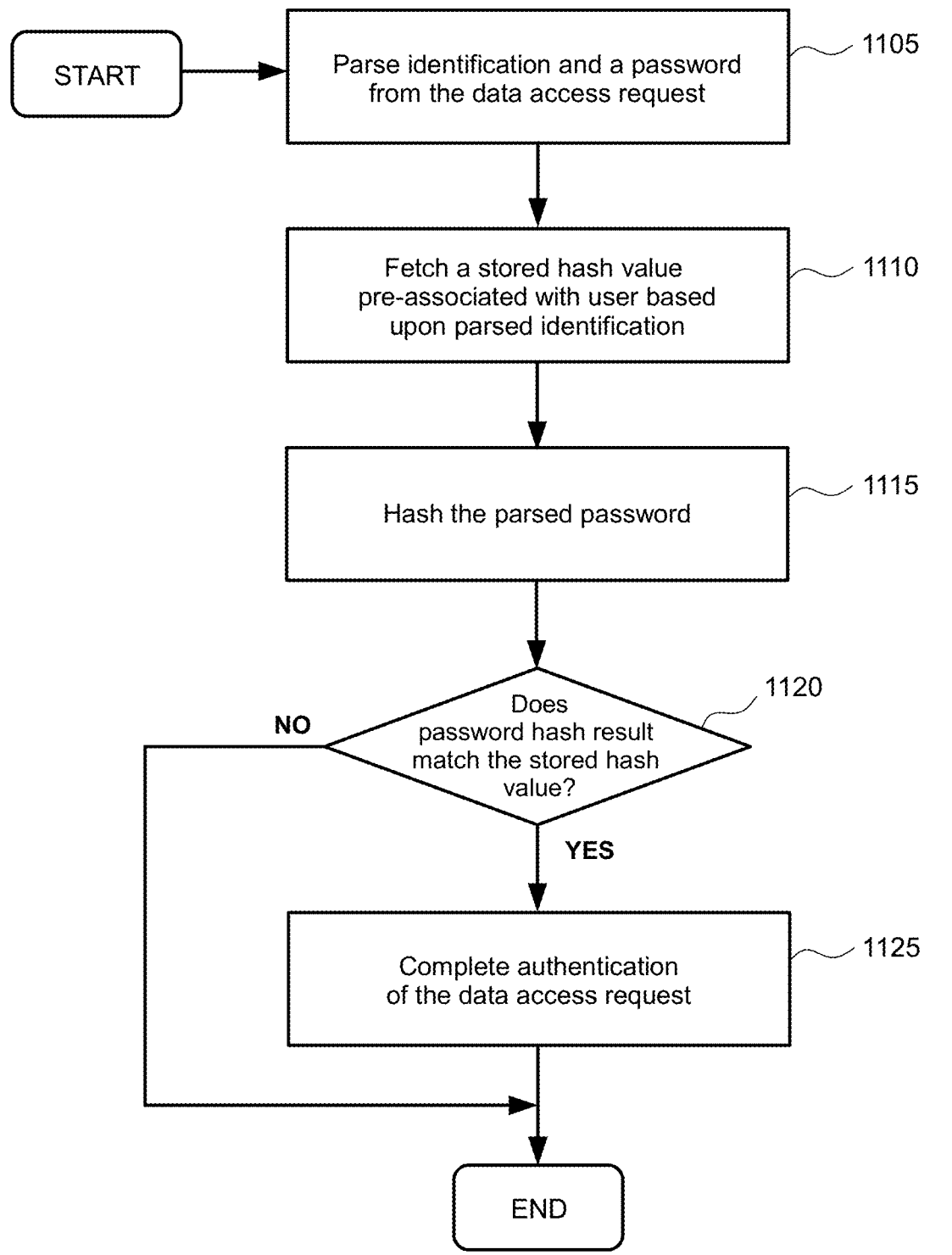
FIG. 11 illustrates a method of authenticating a data access request, according to one or more embodiments.

FIG. 11 illustrates a method 1100 of authenticating the data access request. The method 1100 provides substeps in the context of step 530 of the method 500, according to one or more embodiments. The method 1100 begins at step 1105, where the cloud server application parses identification and a password from the data access request. At step 1110, the cloud server application fetches a stored hash value pre-associated with the user based upon the identification parsed at step 1105. In an embodiment, the cloud server application looks up and retrieves the stored hash value by interfacing with the directory server system associated with the managed services domain. At step 1115, the cloud server application hashes the password parsed at step 1105 by applying to the parsed password one or more cryptographic hash functions corresponding to the stored hash value. In an embodiment, the cloud server application communicates with the directory server system to facilitate application of the one or more cryptographic hash functions. At step 1120, the cloud server application determines whether a result of the password hash matches the stored hash value. Responsive to determining that the result of the password hash matches the stored hash value, at step 1125 the cloud server application completes authentication of the data access request. Conversely, responsive to determining that the result of the password hash does not match the stored hash value, the cloud server application proceeds to the end of the method 1100 without completing authentication of the data access request.

In sum, authenticating the data access request according to the method 1100 includes parsing identification and a password from the data access request, fetching a stored hash value pre-associated with the user based upon the parsed identification, hashing the password by applying to the parsed password one or more cryptographic hash functions corresponding to the stored hash value, and, responsive to determining that a result of the password hash matches the stored hash value, completing authentication of the data access request.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving file data associated with a user for storage in a managed services domain;
applying an ensemble learning model to devise a data distribution technique for the file data based upon contextual information associated with the user, wherein applying the ensemble learning model comprises:

deriving topical context data by applying natural language processing (NLP) to the contextual information; and deriving a plurality of file data portions by applying NLP to the file data based upon the topical context data;

encrypting the file data; and based upon the data distribution technique, dividing the file data to store among a cloud computing layer, a fog computing layer, and a local computing layer by performing a hash transformation and applying at least one cyclic error correcting code.

2. The computer-implemented method of claim 1, further comprising:

receiving a data access request associated with the file data;

authenticating the data access request; and restoring the file data via decryption.

3. The computer-implemented method of claim 2, wherein authenticating the data access request comprises:

parsing identification and a password from the data access request;

fetching a stored hash value pre-associated with the user based upon the parsed identification;

hashing the password by applying to the parsed password one or more cryptographic hash functions corresponding to the stored hash value; and responsive to determining that a result of the password hash matches the stored hash value, completing authentication of the data access request.

4. The computer-implemented method of claim 1, wherein applying the ensemble learning model further comprises:

applying at least one multi-class classification technique to the plurality of file data portions.

5. The computer-implemented method of claim 4, wherein applying the ensemble learning model further comprises:

determining a distribution plan for the plurality of file data portions based upon application of the at least one multi-class classification technique.

6. The computer-implemented method of claim 1, wherein deriving the topical context data comprises:

creating a plurality of encoded feature vectors by applying at least one NLP model to raw data associated with the user; and obtaining numerical topical output by applying at least one clustering algorithm to the plurality of encoded feature vectors.

7. The computer-implemented method of claim 6, wherein creating the plurality of encoded feature vectors comprises:

deriving at least one data representation based upon application types or data types accessed by the user.

8. The computer-implemented method of claim 6, wherein creating the plurality of encoded feature vectors comprises:

deriving at least one data representation pertaining to frequency of application access or data access by the user; and deriving at least one data representation pertaining to computing resource usage or storage patterns related to application access or data access by the user.

9. The computer-implemented method of claim 6, wherein a respective feature of one of the plurality of encoded feature vectors is associated with a respective topic based upon the numerical topical output obtained for the respective feature.

10. The computer-implemented method of claim 1, wherein deriving the plurality of file data portions comprises:

identifying topical patterns among datapoints within the file data by applying at least one NLP model in view of the topical context data; and allocating the datapoints within the file data to the plurality of file data portions by applying at least one clustering algorithm based upon the identified topical patterns.

11. The computer-implemented method of claim 1, wherein dividing the file data comprises:

storing separate parts of the file data among the cloud computing layer, the fog computing layer, and the local computing layer.

12. The computer-implemented method of claim 1, wherein dividing the file data comprises:

storing redundant dependencies among each of the cloud computing layer, the fog computing layer, and the local computing layer.

13. The computer-implemented method of claim 1, wherein the contextual information includes user frequency of data user or user frequency of application use.

14. The computer-implemented method of claim 1, wherein the contextual information includes user system configuration or user file storage pattern.

15. A computer program product comprising a computer readable storage medium having program instructions embodied therewith, the program instructions executable by a computing device to cause the computing device to:

receive file data associated with a user for storage in a managed services domain;

apply an ensemble learning model to devise a data distribution technique for the file data based upon contextual information associated with the user, wherein applying the ensemble learning model comprises:

deriving topical context data by applying natural language processing (NLP) to the contextual information; and deriving a plurality of file data portions by applying NLP to the file data based upon the topical context data;

encrypt the file data; and based upon the data distribution technique, divide the file data to store among a cloud computing layer, a fog computing layer, and a local computing layer by performing a hash transformation and applying at least one cyclic error correcting code.

16. The computer program product of claim 15, wherein the program instructions further cause the computing device to:

receive a data access request associated with the file data;

authenticate the data access request; and restore the file data via decryption.

17. A system comprising:

at least one processor; and a memory storing an application program, which, when executed on the at least one processor, performs an operation comprising:

receiving file data associated with a user for storage in a managed services domain;

applying an ensemble learning model to devise a data distribution technique for the file data based upon contextual information associated with the user, wherein applying the ensemble learning model comprises:
  deriving topical context data by applying natural language processing (NLP) to the contextual information; and
  deriving a plurality of file data portions by applying NLP to the file data based upon the topical context data;
encrypting the file data; and
based upon the data distribution technique, dividing the file data to store among a cloud computing layer, a fog computing layer, and a local computing layer by performing a hash transformation and applying at least one cyclic error correcting code.

18. The system of claim 17, wherein the operation further comprises:
receiving a data access request associated with the file data;
authenticating the data access request; and
restoring the file data via decryption.

* * * * *